United States Patent
Akazaki et al.

(12) 
(10) Patent No.: US 7,831,377 B2
(45) Date of Patent: Nov. 9, 2010

(54) IGNITION TIMING CONTROL SYSTEM AND METHOD FOR INTERNAL COMBUSTION ENGINE AND ENGINE CONTROL UNIT

(75) Inventors: Shusuke Akazaki, Saitama-ken (JP); Takafumi Komori, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 12/434,995

(22) Filed: May 4, 2009

(65) Prior Publication Data

US 2009/0293842 A1 Dec. 3, 2009

(30) Foreign Application Priority Data

May 30, 2008 (JP) .............................. 2008-142410

(51) Int. Cl.
*F02P 5/153* (2006.01)
(52) U.S. Cl. .................................. 701/111; 123/406.42
(58) Field of Classification Search ............ 123/406.22, 123/406.24, 406.41, 406.42, 435–436; 701/110–111
See application file for complete search history.

(56) References Cited

U.S. PATENT DOCUMENTS

| | | | |
|---|---|---|---|
| 2007/0251494 A1 | 11/2007 | Hashizume et al. | |
| 2007/0277780 A1* | 12/2007 | Akazaki et al. | 123/406.22 |
| 2008/0053404 A1 | 3/2008 | Mizuno et al. | |

FOREIGN PATENT DOCUMENTS

| | | |
|---|---|---|
| EP | 1 300 588 A1 | 4/2003 |
| EP | 1 862 670 A1 | 12/2007 |
| JP | 08-128378 | 5/1996 |
| JP | 2000-110637 | 4/2000 |
| JP | 2004-100566 | 4/2004 |
| JP | 2008-057438 | 3/2008 |
| JP | 2009-287493 | * 12/2009 |

OTHER PUBLICATIONS

European Search Report 09160362.1-1263 dated Aug. 27, 2009.
Japanese Office Action, Document No. 2008-142410, issued May 18, 2010, a total of 2 pages.

* cited by examiner

*Primary Examiner*—Hai H Huynh
(74) *Attorney, Agent, or Firm*—Squire, Sanders & Dempsey L.L.P.

(57) ABSTRACT

An ignition timing control system for an internal combustion engine, which is capable of properly carrying out ignition timing control over a wide control range, thereby making it possible to improve fuel economy, and is capable of suppressing combustion fluctuation, thereby making it possible to improve drivability. Ignition timing is calculated, when the engine is determined to be in an intense combustion mode, such that a largest in-cylinder pressure angle at which in-cylinder pressure becomes largest converges to a target angle, whereas when the engine is determined to be in a weak combustion mode, the same is calculated by feedback, based on the target angle and combustion state parameters indicative of a combustion state in the cylinder.

27 Claims, 17 Drawing Sheets

F I G. 3
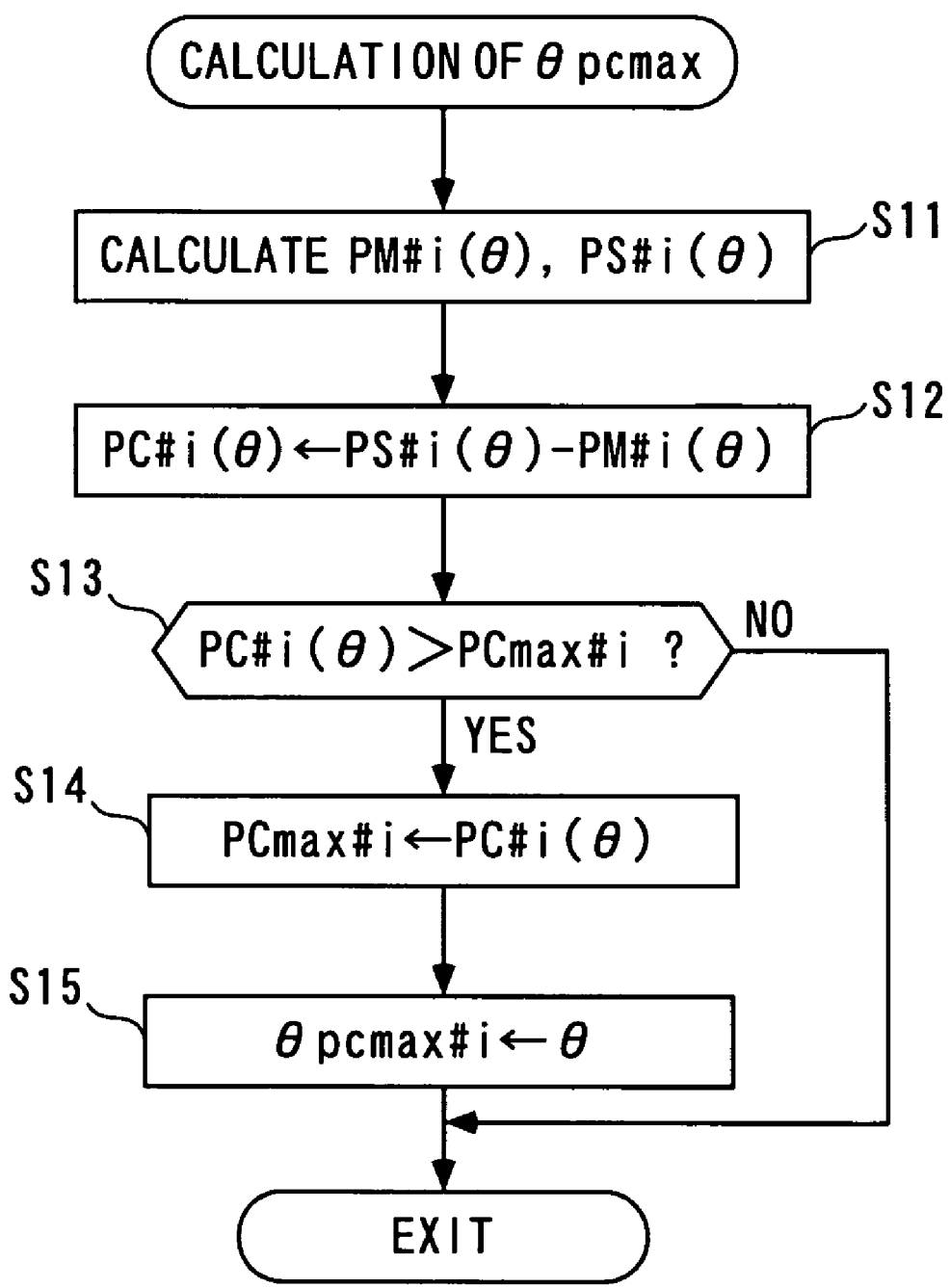

IGNITION TIMING CONTROL SYSTEM AND METHOD FOR INTERNAL COMBUSTION ENGINE AND ENGINE CONTROL UNIT

BACKGROUND OF THE INVENTION

1. Field of the Invention

The present invention relates to an ignition timing control system and method for an internal combustion engine, which feedback-control ignition timing of the engine, and an engine control unit.

2. Description of the Related Art

Conventionally, as an ignition timing control system for an internal combustion engine, the present assignee has already proposed one disclosed in Japanese Laid-Open Patent Publication (Kokai) No. 2008-57438. This internal combustion engine is a gasoline engine which includes a plurality of cylinders, and the cylinders each have an in-cylinder pressure sensor mounted therein, for detecting in-cylinder pressure generated therein. In this ignition timing control system, a crank angle position at which the in-cylinder pressure becomes largest is calculated as a largest in-cylinder pressure angle, based on the detected in-cylinder pressure and the crank angle position, and the ignition timing is controlled by feedback control using a sliding mode control algorithm such that the largest in-cylinder pressure angle converges to a predetermined target angle.

FIG. 19 shows changes in in-cylinder pressure occurring from a the compression stroke to an expansion stroke. It should be noted that a curve M in FIG. 19 shows motoring pressure generated when combustion is not performed in a cylinder. When a combustion state in the cylinder is stable, a peak at which the in-cylinder pressure becomes largest clearly appears (see a curve A), whereby it is possible to accurately calculate the above-described largest in-cylinder pressure angle. However, if an EGR amount is large or load on the engine is small, for example, there occurs reduced combustion speed or increased combustion fluctuation, which prevents the peak of the in-cylinder pressure from appearing clearly (see a curve B), and hence there is a fear that it is impossible to accurately calculate the largest in-cylinder pressure angle. Further, if combustion pressure generated by combustion is smaller than a largest value of the motoring pressure (see a curve C) due to a large retarded amount of the ignition timing, the crank angle position of the largest value of the motoring pressure is erroneously calculated as the largest in-cylinder pressure angle. In these cases where the proper largest in-cylinder pressure angle cannot be obtained, it is impossible to carry out most appropriate ignition timing control. That is, in this ignition timing control system, the control range in which most appropriate ignition timing control can be carried out is narrow, which causes degraded fuel economy or increased combustion fluctuation.

SUMMARY OF THE INVENTION

It is an object of the present invention to provide an ignition timing control system and method for an internal combustion engine, and an engine control unit, which are capable of properly carrying out ignition timing control over a wide control range, thereby making it possible to improve fuel economy, and are capable of suppressing combustion fluctuation, thereby making it possible to improve drivability.

To attain the above object, in a first aspect of the present invention, there is provided an ignition timing control system for an internal combustion engine, comprising in-cylinder pressure-detecting means for detecting pressure in a cylinder of the engine as in-cylinder pressure, crank angle position-detecting means for detecting a crank angle position of the engine, largest in-cylinder pressure angle-calculating means for calculating a crank angle position at which the in-cylinder pressure becomes largest as a largest in-cylinder pressure angle, based on the detected in-cylinder pressure and crank angle position, target angle-setting means for setting a target angle serving as a target of the largest in-cylinder pressure angle, combustion state parameter-calculating means for calculating combustion state parameters indicative of a combustion state in the cylinder, other than the largest in-cylinder pressure angle, based on the in-cylinder pressure and the crank angle position, combustion mode-determining means for determining whether a combustion mode is an intense combustion mode or a weak combustion mode, based on a plurality of kinds of the calculated combustion state parameters including the largest in-cylinder pressure angle, and ignition timing-calculating means for calculating ignition timing, when the determined combustion mode is the intense combustion mode, such that the calculated largest in-cylinder pressure angle converges to the set target angle, and when the determined combustion mode is the weak combustion mode, by feedback, based on the target angle and the calculated combustion state parameters.

With the configuration of the ignition timing control system according to the first aspect of the present invention, a crank angle at which the in-cylinder pressure becomes largest is calculated as the largest in-cylinder pressure angle, based on the detected in-cylinder pressure and crank angle position, by the largest in-cylinder pressure angle-calculating means, and the combustion state parameter indicative of a combustion state in the cylinder, other than the largest in-cylinder pressure angle, is calculated by the combustion state parameter-calculating means. Further, it is determined by the combustion mode-determining means whether the combustion mode is the intense combustion mode or the weak combustion mode, based on a plurality of kinds of the combustion state parameters including the largest in-cylinder pressure angle. The term "intense combustion mode" in the present invention is intended to mean a combustion state in which relatively intense combustion is performed and a peak at which the in-cylinder pressure becomes largest clearly appears, thereby making it possible to accurately calculate the largest in-cylinder pressure angle. On the other hand, the term "weak combustion mode" is intended to mean a combustion state in which relatively weak combustion is performed, and the peak of the in-cylinder pressure does not clearly appear or the combustion pressure is lower than the largest value of the motoring pressure, thereby making it impossible to accurately calculate the largest in-cylinder pressure angle. As described above, the determination of the combustion mode is carried out based on a plurality of kinds of combustion state parameters including the largest in-cylinder pressure angle. The combustion state parameters each indicate a combustion state in the cylinder. Further, normally, the in-cylinder pressure-detecting means is configured to detect the in-cylinder pressure by detecting not the in-cylinder pressure itself but a rate of change in the in-cylinder pressure, and then integrating the detected value thereof, and hence there can be a risk that each of the combustion state parameters calculated based on the in-cylinder pressure may contain an error caused by drift in the detected in-cylinder pressure. Therefore, by determining the combustion mode according to combustion state parameters, and based on the correlation between these parameters, it is possible to properly determine the combustion mode, while eliminating the influence of drift in the detected in-cylinder pressure.

Further, when the combustion mode is the intense combustion mode, the ignition timing is calculated by feedback by the ignition timing-calculating means such that the largest in-cylinder pressure angle converges to the target angle. As mentioned above, in the intense combustion mode, the peak at which the in-cylinder pressure becomes largest clearly appears, whereby it is possible to accurately calculate the largest in-cylinder pressure angle, and by feedback-controlling the ignition timing using this largest in-cylinder pressure angle, it is possible to properly carry out the ignition timing control in the intense combustion mode. However, in the weak combustion mode, the ignition timing is calculated by feedback based on the target angle and the combustion state parameters other than the largest in-cylinder pressure angle. As described above, in the weak combustion mode, there is a fear that the accurate largest in-cylinder pressure angle cannot be obtained, and hence, using, in place of the largest in-cylinder pressure angle, the combustion state parameters which reflect the combustion state, other than the largest in-cylinder pressure angle, the ignition timing control in the weak combustion mode can be carried out by feedback-controlling the ignition timing. As described above, according to the present invention, it is possible to properly carry out ignition timing control over a wide control range including both of the intense combustion mode and the weak combustion mode, thereby making it possible to improve fuel economy, and suppress combustion fluctuation, thereby making it possible to improve drivability.

Preferably, the combustion state parameter-calculating means comprises motoring pressure-estimating means for estimating pressure to be generated when combustion is not performed in the cylinder, as motoring pressure, and largest combustion pressure angle-calculating means for calculating a crank angle position at which a difference between the in-cylinder pressure and the estimated motoring pressure becomes largest, as a largest combustion pressure angle, and the combustion state parameter is the calculated largest combustion pressure angle.

With the configuration of the preferred embodiment, pressure to be generated when combustion is not performed in the cylinder is estimated as motoring pressure by the motoring pressure-estimating means. Then, a crank angle position at which the difference between the in-cylinder pressure and the motoring pressure becomes largest is calculated as the largest combustion pressure angle by the largest combustion pressure angle-calculating means. The difference between the in-cylinder pressure and the motoring pressure is a pressure generated by the combustion itself in the cylinder, and the largest combustion pressure angle at which the above-described difference becomes largest accurately represents one characteristic of the combustion state in the cylinder. Particularly, if the combustion pressure is smaller than the largest value of the motoring pressure, erroneous calculation as in the case of the above-mentioned calculation of the largest in-cylinder pressure angle, never occurs, thereby making it possible to accurately calculate the largest combustion pressure angle which reflects an actual state of generation of the combustion pressure. Therefore, by employing the largest combustion pressure angle as a combustion state parameter, it is possible to properly carry out the ignition timing control in the weak combustion mode.

More preferably, the combustion mode-determining means determines the combustion mode using the largest combustion pressure angle and the largest in-cylinder pressure angle as the combustion state parameters.

With the configuration of the preferred embodiment, the determination of the combustion mode is carried out using the largest combustion pressure angle and the largest in-cylinder pressure angle. As described hereinafter, if the combustion mode is the intense combustion mode, there is a predetermined correlation between the largest combustion pressure angle and the largest in-cylinder pressure angle. Therefore, the combustion mode in which the correlation between the two is maintained is determined as the intense combustion mode, and the combustion mode in which the correlation between the two is not maintained as the weak combustion mode, whereby it is possible to carry out the determination of the combustion mode properly and with ease.

Preferably, the combustion state parameter-calculating means comprises largest heat release rate angle-calculating means for calculating a crank angle at which a heat release rate in the cylinder becomes largest, as a largest heat release rate angle, based on the in-cylinder pressure, and the combustion state parameter is the calculated largest heat release rate angle.

With the configuration of the preferred embodiment, the crank angle position at which the rate of heat release in the cylinder becomes largest is calculated as the largest heat release rate angle based on the in-cylinder pressure by the largest heat release rate angle-calculating means. The heat release rate in the cylinder indicates changes in the heat release amount occurring from the start to the end of the combustion, and the largest heat release rate angle at which the rate becomes largest accurately represents one characteristic of the combustion state in the cylinders. Therefore, by employing the largest heat release rate angle as a combustion state parameter, it is possible to properly carry out the ignition timing control in the weak combustion mode.

Preferably, the combustion state parameter-calculating means comprises ignition position-calculating means for calculating a crank angle position corresponding to an ignition timing in the cylinder as an ignition position, based on the in-cylinder pressure, and the combustion state parameter is the calculated ignition position.

With the configuration of the preferred embodiment, the crank angle position corresponding to the ignition timing in the cylinder is calculated as an ignition position based on the in-cylinder pressure by the ignition position-calculating means. The ignition position is a start position of combustion, and accurately represents one characteristic of the combustion state in the cylinder. Therefore, by employing the ignition position as a combustion state parameter, it is possible to properly carry out the ignition timing control in the weak combustion mode.

Preferably, the cylinder comprises a plurality of cylinders, and the combustion mode-determining means determines the combustion mode for the cylinders, on a cylinder-by-cylinder basis, the ignition timing-calculating means calculating the ignition timing for the cylinders, on a cylinder-by-cylinder basis.

With the configuration of the preferred embodiment, the cylinder comprises a plurality of cylinders, and the determination of the combustion mode and calculation of ignition timing are carried out for the cylinders on a cylinder-by-cylinder basis. Therefore, it is possible to properly determine the combustion mode on a cylinder-by-cylinder basis, and properly feedback-control the ignition timing for the respective cylinders on a cylinder-by-cylinder basis. As a result, even if output characteristics vary between the cylinders, it is possible to compensate for the variation, to thereby suppress the variation of combustion between the cylinders.

Preferably, the ignition timing control system further comprises operating condition-detecting means for detecting operating conditions of the engine, warm-up operation-determining means for determining based on the detected operating conditions whether or not the engine is in warm-up operation for activating a catalyst, rotational speed-detecting means for detecting a rotational speed of the engine, and target rotational speed-setting means for setting a target rotational speed serving as a target of the rotational speed, and the target angle-setting means sets the target angle by feedback such that the detected rotational speed converges to the set target rotational speed, when it is determined that the engine is in the warm-up operation.

With the configuration of the preferred embodiment, according to the detected operating conditions of the engine, it is determined whether or not the engine is in warm-up operation for activating a catalyst by warm-up operation-determining means. Further, the target rotational speed serving as a target of the rotational speed of the engine is set by the target rotational speed-setting means. Then, if it is determined that the engine is in warm-up operation, a target angle is set by feedback by the target angle-setting means such that the detected rotational speed converges to the target rotational speed. Further, by the above-described operation of the first aspect, the ignition timing is calculated by feedback such that the largest in-cylinder pressure angle converges to the target angle set as above. By the above-described double feedback-control comprising the feedback-control of the target angle and the feedback-control of the ignition timing, it is possible to properly control the ignition timing in the warm-up operation, maintaining the rotational speed at the target rotational speed.

More preferably, the combustion mode-determining means determines that the combustion mode is the weak combustion mode, when it is determined that the engine is in the warm-up operation.

With the configuration of the preferred embodiment, when it is determined that the engine is in warm-up operation, the combustion mode is determined to be the weak combustion mode. Generally, during the warm-up operation, the ignition timing is retarded in order to early activate the catalyst by supplying heat generated by afterburning to the catalyst, and hence in such a case, the combustion is likely to be in the weak combustion. Therefore, when the engine is in warm-up operation, by determining the combustion mode as the weak combustion mode, it is possible to properly carry out the determination, and further dispense with the calculation of the combustion state parameter, thereby making it possible to reduce the computation load.

Preferably, the ignition timing control system further comprises misfire margin parameter-calculating means for calculating a misfire margin parameter indicative of a margin from a limit beyond which a misfire occurs, for the cylinders, on a cylinder-by-cylinder basis, based on the in-cylinder pressure and the estimated motoring pressure, and combustion state-stabilizing means for controlling the combustion state in the cylinders in a stabilizing direction, when the calculated misfire margin parameter is not more than a predetermined threshold.

With the configuration of the preferred embodiment, the misfire margin parameter indicative of a margin from a limit beyond which a misfire occurs is calculated based on the in-cylinder pressure and the estimated motoring pressure for the cylinders on a cylinder-by-cylinder basis, by the misfire margin parameter-calculating means. Then, when the misfire margin parameter is not more than the predetermined threshold, the combustion state in the cylinders is controlled in a stabilizing direction by the combustion state-stabilizing means. This causes the combustion state in the cylinders to be controlled in the stabilizing direction when the actual misfire margin is small, whereby it is possible to positively prevent occurrence of a misfire.

To attain the above object, in a second aspect of the present invention, there is provided a method of controlling ignition timing of an internal combustion engine, comprising an in-cylinder pressure-detecting step of detecting pressure in a cylinder of the engine as in-cylinder pressure, a crank angle position-detecting step of detecting a crank angle position of the engine, a largest in-cylinder pressure angle-calculating step of calculating a crank angle position at which the in-cylinder pressure becomes largest as a largest in-cylinder pressure angle, based on the detected in-cylinder pressure and crank angle position, a target angle-setting step of setting a target angle serving as a target of the largest in-cylinder pressure angle, a combustion state parameter-calculating step of calculating combustion state parameters indicative of a combustion state in the cylinder, other than the largest in-cylinder pressure angle, based on the in-cylinder pressure and the crank angle position, a combustion mode-determining step of determining whether a combustion mode is an intense combustion mode or a weak combustion mode, based on a plurality of kinds of the calculated combustion state parameters including the largest in-cylinder pressure angle, and an ignition timing-calculating step of calculating ignition timing, when the determined combustion mode is the intense combustion mode, such that the calculated largest in-cylinder pressure angle converges to the set target angle, and when the determined combustion mode is the weak combustion mode, by feedback, based on the target angle and the calculated combustion state parameters.

With the configuration of the method according to the second aspect of the present invention, it is possible to obtain the same advantageous effects as provided by the first aspect of the present invention.

Preferably, the combustion state parameter-calculating step comprises a motoring pressure-estimating step of estimating pressure to be generated when combustion is not performed in the cylinder, as motoring pressure, and a largest combustion pressure angle-calculating step of calculating a crank angle position at which a difference between the in-cylinder pressure and the estimated motoring pressure becomes largest, as a largest combustion pressure angle, and the combustion state parameter is the calculated largest combustion pressure angle.

More preferably, the combustion mode-determining step includes determining the combustion mode using the largest combustion pressure angle and the largest in-cylinder pressure angle as the combustion state parameters.

Preferably, the combustion state parameter-calculating step comprises a largest heat release rate angle-calculating step of calculating a crank angle at which a heat release rate in the cylinder becomes largest, as a largest heat release rate angle, based on the in-cylinder pressure, and the combustion state parameter is the calculated largest heat release rate angle.

Preferably, the combustion state parameter-calculating step comprises an ignition position-calculating step of calculating a crank angle position corresponding to an ignition timing in the cylinder as an ignition position, based on the in-cylinder pressure, and the combustion state parameter is the calculated ignition position.

Preferably, the cylinder comprises a plurality of cylinders, and the combustion mode-determining step includes determining the combustion mode for the cylinders, on a cylinderby-cylinder basis, and the ignition timing-calculating step including calculating the ignition timing for the cylinders, on a cylinder-by-cylinder basis.

Preferably, the method further comprises an operating condition-detecting step of detecting operating conditions of the engine, a warm-up operation-determining step of determining based on the detected operating conditions whether or not the engine is in warm-up operation for activating a catalyst, a rotational speed-detecting step of detecting a rotational speed of the engine, and a target rotational speed-setting step of setting a target rotational speed serving as a target of the rotational speed, and the target angle-setting step includes setting the target angle by feedback such that the detected rotational speed converges to the set target rotational speed, when it is determined that the engine is in the warm-up operation.

More preferably, the combustion mode-determining step includes determining that the combustion mode is the weak combustion mode, when it is determined that the engine is in the warm-up operation.

More preferably, the method further comprises a misfire margin parameter-calculating step of calculating a misfire margin parameter indicative of a margin from a limit beyond which a misfire occurs, for the cylinders, on a cylinder-by-cylinder basis, based on the in-cylinder pressure and the estimated motoring pressure, and a combustion state-stabilizing step of controlling the combustion state in the cylinders in a stabilizing direction, when the calculated misfire margin parameter is not more than a predetermined threshold.

With the configurations of these preferred embodiments, it is possible to obtain the same advantageous effects as provided by the respective corresponding preferred embodiments of the first aspect of the present invention.

To attain the above object, in a third aspect of the present invention, there is provided an engine control unit including a control program for causing a computer to execute a method of controlling ignition timing of an internal combustion engine, wherein the method comprises an in-cylinder pressure-detecting step of detecting pressure in a cylinder of the engine as in-cylinder pressure, a crank angle position-detecting step of detecting a crank angle position of the engine, a largest in-cylinder pressure angle-calculating step of calculating a crank angle position at which the in-cylinder pressure becomes largest as a largest in-cylinder pressure angle, based on the detected in-cylinder pressure and crank angle position, a target angle-setting step of setting a target angle serving as a target of the largest in-cylinder pressure angle, a combustion state parameter-calculating step of calculating combustion state parameters indicative of a combustion state in the cylinder, other than the largest in-cylinder pressure angle, based on the in-cylinder pressure and the crank angle position, a combustion mode-determining step of determining whether a combustion mode is an intense combustion mode or a weak combustion mode, based on a plurality of kinds of the calculated combustion state parameters including the largest in-cylinder pressure angle, and an ignition timing-calculating step of calculating ignition timing, when the determined combustion mode is the intense combustion mode, such that the calculated largest in-cylinder pressure angle converges to the set target angle, and when the determined combustion mode is the weak combustion mode, by feedback, based on the target angle and the calculated combustion state parameters.

With the configuration of the control unit according to the third aspect of the present invention, it is possible to obtain the same advantageous effects as provided by the first aspect of the present invention.

Preferably, the combustion state parameter-calculating step comprises a motoring pressure-estimating step of estimating pressure to be generated when combustion is not performed in the cylinder, as motoring pressure, and a largest combustion pressure angle-calculating step of calculating a crank angle position at which a difference between the in-cylinder pressure and the estimated motoring pressure becomes largest, as a largest combustion pressure angle, and the combustion state parameter is the calculated largest combustion pressure angle.

More preferably, the combustion mode-determining step includes determining the combustion mode using the largest combustion pressure angle and the largest in-cylinder pressure angle as the combustion state parameters.

Preferably, the combustion state parameter-calculating step comprises a largest heat release rate angle-calculating step of calculating a crank angle at which a heat release rate in the cylinder becomes largest, as a largest heat release rate angle, based on the in-cylinder pressure, and the combustion state parameter is the calculated largest heat release rate angle.

Preferably, the combustion state parameter-calculating step comprises an ignition position-calculating step of calculating a crank angle position corresponding to an ignition timing in the cylinder as an ignition position, based on the in-cylinder pressure, and the combustion state parameter is the calculated ignition position.

Preferably, the cylinder comprises a plurality of cylinders, and the combustion mode-determining step includes determining the combustion mode for the cylinders, on a cylinder-by-cylinder basis, the ignition timing-calculating step including calculating the ignition timing for the cylinders, on a cylinder-by-cylinder basis.

Preferably, the method further comprises an operating condition-detecting step of detecting operating conditions of the engine, a warm-up operation-determining step of determining based on the detected operating conditions whether or not the engine is in warm-up operation for activating a catalyst, a rotational speed-detecting step of detecting a rotational speed of the engine, and a target rotational speed-setting step of setting a target rotational speed serving as a target of the rotational speed, and the target angle-setting step includes setting the target angle by feedback such that the detected rotational speed converges to the set target rotational speed, when it is determined that the engine is in the warm-up operation.

More preferably, the combustion mode-determining step includes determining that the combustion mode is the weak combustion mode, when it is determined that the engine is in the warm-up operation.

More preferably, the method further comprises a misfire margin parameter-calculating step of calculating a misfire margin parameter indicative of a margin from a limit beyond which a misfire occurs, for the cylinders, on a cylinder-by-cylinder basis, based on the in-cylinder pressure and the estimated motoring pressure, and a combustion state-stabilizing step of controlling the combustion state in the cylinders in a stabilizing direction, when the calculated misfire margin parameter is not more than a predetermined threshold.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIG. 3 is a flowchart of a largest combustion pressure angle calculation process;

DETAILED DESCRIPTION OF PREFERRED EMBODIMENTS

Figure 1:
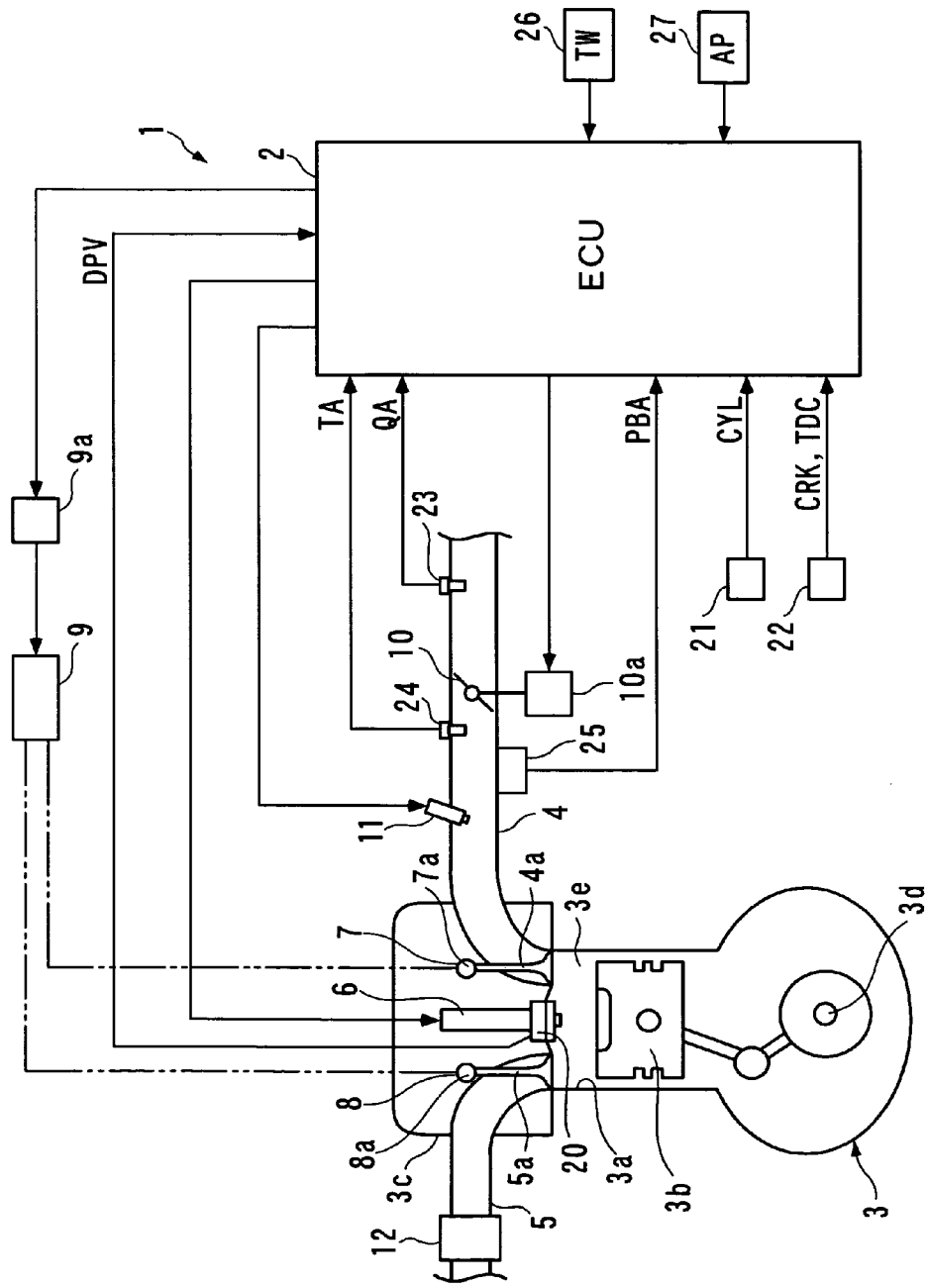
FIG. 1 is a schematic diagram of an ignition timing control system according to an embodiment of the present invention, and an engine incorporating the ignition timing control system.

The invention will now be described in detail with reference to the drawings showing preferred embodiment thereof. FIG. 1 schematically shows an ignition timing control system 1 according to an embodiment of the present invention and an internal combustion engine (hereinafter referred to as "the engine"3 incorporating the ignition timing control system 1. The engine 3 is e.g. an in-line four-cylinder gasoline engine for a vehicle, and a combustion chamber 3e is defined between a piston 3b and a cylinder head 3c for each cylinder 3a of the engine 3.

The cylinder head 3c has an intake pipe 4 and an exhaust pipe 5 connected thereto, an intake valve 4a and an exhaust valve 5a provided for the respective cylinders 3a, and an ignition plug 6 mounted therethrough such that it faces the combustion chamber 3e. The ignition plug 6 has high voltage applied thereto and then interrupted by a drive signal from an ECU 2, described hereinafter, in timing dependent on ignition timing, thereby performing discharge, whereby ignition of a mixture is sequentially performed in the cylinders 3a.

The ignition plug 6 has an in-cylinder pressure sensor 20 (in-cylinder pressure-detecting means) integrally mounted thereon. The in-cylinder pressure sensor 20 is comprised of a ring-shaped piezoelectric element, and is mounted in a manner sandwiched between the ignition plug 6 and the cylinder head 3c by being screwed into the cylinder head 3c together with the ignition plug 6. The in-cylinder pressure sensor 20 delivers a detected signal indicative of an amount DPV of change in pressure in the cylinder 3a to the ECU 2. The ECU 2 calculates pressure PS in the cylinder 3a (hereinafter referred to as "the in-cylinder pressure") based on the pressure change amount DPV, as described hereinafter.

An intake cam shaft 7 and an exhaust cam shaft 8 of the engine 3 have a plurality of intake cams 7a and exhaust cams 8a (one cam is shown for each of both types) integrally mounted thereon. The intake cam shaft 7 is connected to a crankshaft 3d via a timing chain (not shown), and performs one rotation per two rotations of the crankshaft 3d. The rotation of each intake cam 7a caused by the rotation of the intake cam shaft 7 drives the associated intake valve 4a for opening and closing the same. Similarly, the exhaust cam shaft 8 is connected to the crankshaft 3d via a timing chain, and performs one rotation per two rotations of the crankshaft 3d. The rotation of each exhaust cam 8a caused by the rotation of the exhaust cam shaft 8 drives the associated exhaust valve 5a for opening and closing the same.

Although not shown, each of the intake cams 7a and the exhaust cams 8a is comprised of a low-speed cam and a high-speed cam having a higher cam profile than that of the low-speed cam. These low-speed and high-speed cams are switched by a cam profile switching mechanism 9, whereby the valve timing of the intake valve 4a and the exhaust valve 5a is switched between a low-speed valve timing (hereinafter referred to as "LO.VT") and a high-speed valve timing (hereinafter referred to as "HI.VT"). At HI.VT, valve opening time periods of the intake valve 4a and the exhaust valve 5a, and a valve overlap time period of these valves 4a and 5a are longer than those at LO.VT, and a valve lift amount also becomes larger, whereby the charging efficiency of the mixture in the cylinder 3a is improved. The cam profile switching mechanism 9 is controlled by controlling an electromagnetic control valve 9a using a drive signal supplied from the ECU 2 to change oil pressure supplied to the cam profile switching mechanism 9.

The engine 3 is provided with a cylinder discrimination sensor 21 and a crank angle sensor 22 (crank angle position-detecting means). These sensors 21 and 22 are each formed by a magnet rotor and an MRE pickup, and deliver a pulse signal at the respective predetermined crank angle positions CA. Specifically, the cylinder discrimination sensor 21 generates a CYL signal for discriminating a cylinder at a predetermined crank angle position CA of a particular cylinder 3a, and delivers the CYL signal to the ECU 2. On the other hand, the crank angle sensor 22 generates and delivers a CRK signal and a TDC signal, which are both pulse signals, to the ECU 2 along with rotation of the crankshaft 3d. The CRK signal is delivered whenever the crankshaft 3d rotates through a predetermined angle (e.g. 1°). The ECU 2 calculates the rotational speed of the engine 3 (hereinafter referred to as "the engine speed NE") based on the CRK signal. The TDC signal indicates that each piston 3b in the associated cylinder 3a is in the predetermined crank angle position CA slightly before the top dead center position at the start of the intake stroke, and is delivered whenever the crankshaft 3d rotates through a crank angle 180° in the case of the present example of the 4-cylinder engine. The ECU 2 calculates the crank angle position CA for each cylinder 3a according to the TDC signal and the CRK signal.

A throttle valve 10 (combustion state-stabilizing means) and an injector 11 are provided at respective locations of the intake pipe 4 from upstream to downstream in the mentioned order. An actuator 10a comprised of e.g. a DC motor is connected to the throttle valve 10. An opening of the throttle valve 10 (hereinafter referred to as the "throttle valve opening TH") is controlled by controlling the duty factor of electric current supplied to the actuator 10a by the ECU 2. Further, a fuel injection amount and injection timing of the infector 11 are controlled by a drive signal from the ECU 2. Further, the intake pipe 4 has an air flow sensor 23 inserted therein at a location upstream of the throttle valve 10, and an intake air temperature sensor 24 and an intake pipe pressure sensor 25 are provided at respective locations downstream of the throttle valve 10. The air flow sensor 23 detects an intake air amount QA, the intake air temperature sensor 24 detects temperature in the intake pipe 4 (hereinafter referred to as the "intake air temperature TA"), and the intake pipe pressure sensor 25 detects pressure in the intake valve 4 (hereinafter referred to as the "intake air pressure PBA"), whereby these detected signals are delivered to the ECU 2.

A catalytic device 12 is provided in the exhaust pipe 5. The catalytic device 12 is a combination of an NOx catalyst and a three-way catalyst. The NOx catalyst has characteristics that if the air-fuel ratio of a mixture supplied to the engine 3 is leaner than the stoichiometric ratio, the NOx catalyst adsorbs NOx in exhaust gases, whereas if the air-fuel ratio of the mixture supplied to the engine 3 is richer than the stoichiometric ratio, the NOx catalyst reduces the adsorbed NOx. Further, the three-way catalyst purifies i.e. reduces CO, HC, and NOx in exhaust gases by oxidation-reduction reaction.

Further, a coolant temperature sensor 26 and an accelerator pedal opening sensor 27 are connected to the ECU 2. The coolant temperature sensor 26 detects engine coolant temperature TW, i.e. temperature of engine coolant circulating through cylinder blocks of the engine 3, and delivers a signal indicative of the sensed engine coolant temperature TW to the ECU 2. Further, the accelerator pedal opening sensor 27 detects a stepped-on amount of an accelerator pedal, not shown, of the vehicle (hereinafter referred to as "the accelerator pedal opening AP") and delivers a signal indicative of the sensed accelerator pedal opening AP to the ECU 2.

The ECU 2 is implemented by a microcomputer comprised of an I/O interface, a CPU, a RAM, and a ROM, determines operating conditions of the engine 3 and a combustion state of each cylinder 3a according to the detected signals delivered from the above-mentioned various sensors 20 to 27, and carries out engine control including ignition timing control according to the determination results. The ECU 2 corresponds to in-cylinder pressure-detecting means, crank angle position-detecting means, largest in-cylinder pressure angle-calculating means, target angle-setting means, combustion state parameter-calculating means, combustion mode-determining means, ignition timing-calculating means, motoring pressure-estimating means, largest combustion pressure angle-calculating means, largest heat release rate-calculating means, ignition position-calculating means, operating condition-detecting means, warm-up operation-determining means, rotational speed-detecting means, target rotational speed-setting means, misfire margin parameter-calculating means, and combustion state-stabilizing means.

Figure 2:
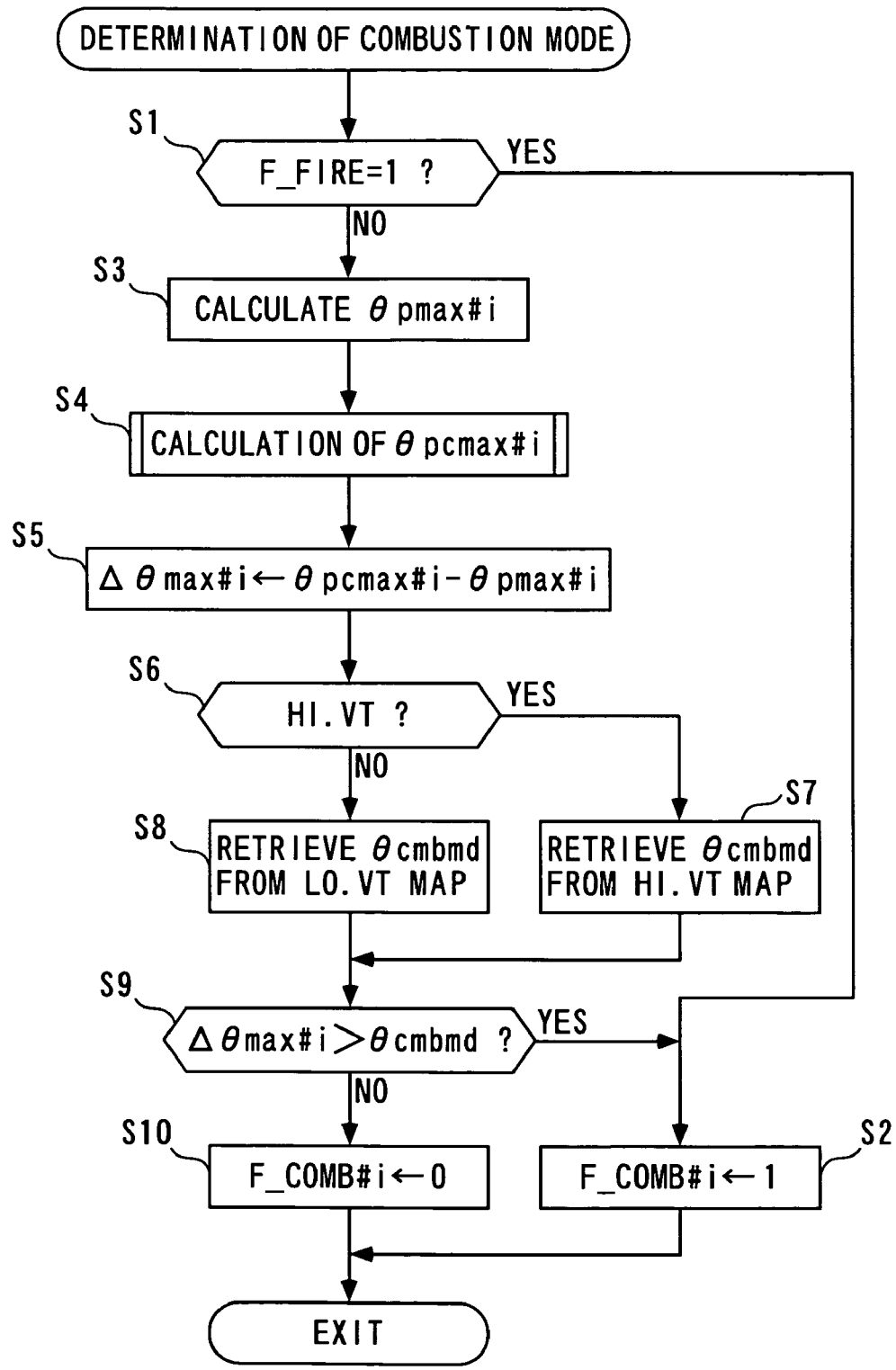
FIG. 2 is a flowchart of a combustion mode determination process.

FIG. 2 shows a combustion mode determination process, which is executed by the ECU 2. The combustion mode determination process is carried out in synchronism with generation of the TDC signal, for determining whether the combustion state (combustion mode) of the cylinders 3a is the intense combustion mode or the weak combustion mode, referred to hereinabove in the Summary of the Invention. Further, the combustion mode determination process is carried out on a cylinder-by-cylinder basis. Therefore, in the following description, various kinds of parameters which are calculated and set for the respective cylinders 3a are denoted using reference symbols including "#i" attached at the end thereof in place of respective cylinder numbers (#1 to #4) of the cylinders 3a.

In the present process, first, in a step 1 (shown as S1 in abbreviated form; the following steps are also shown in abbreviated form), it is determined whether or not a warm-up operation flag F_FIRE is equal to 1. The warm-up operation flag F_FIRE indicates that a warm-up operation for activating the NOx catalyst and the three-way catalyst of the catalytic device 12 is being performed after starting the engine 3. If the answer to the question of the step 1 is affirmative (YES), it is determined that the combustion mode is the weak combustion mode, and to indicate this fact, a weak combustion mode flag F_COMB#i is set to 1 (step 2), followed by terminating the present process.

The combustion mode of the engine 3 during the warm-up operation thereof is determined to be the weak combustion mode, as mentioned above, for the following reason: In general, in a warm-up operation, the ignition timing is retarded to be later than the top dead center position (hereinafter referred to as the "TDC position") at the end of the compression stroke with a view to activating the NOx catalyst and the three-way catalyst of the catalytic device 12 earlier by supplying heat generated by afterburning to the catalytic device 12 thereto. In this case, the combustion pressure PC is likely to be smaller than a largest value of motoring pressure PM (see FIG. 6B). Therefore, during the warm-up operation of the engine 3, it is immediately determined that the combustion mode is the weak combustion mode. By thus determining the combustion mode as the weak combustion mode, it is possible to properly perform the determination, and it becomes unnecessary to carry out steps 3 to 10, referred to hereinafter, for determining the combustion mode, which makes it possible to reduce computation load on the ECU 2.

If the answer to the question of the step 1 is negative (NO), i.e. if it is determined that the engine 3 is not in warm-up operation, a largest in-cylinder pressure angle $\theta$ pmax#i (combustion state parameter) is calculated (step 3), and a largest combustion pressure angle θ pcmax#i (combustion state parameter) is calculated (step 4).

The largest in-cylinder pressure angle θ pmax#i is calculated by the ECU 2 with reference to changes in in-cylinder pressure PS#i during a predetermined largest in-cylinder pressure angle-calculating section. The largest in-cylinder pressure angle-calculating section begins at a predetermined crank angle position CA earlier than the TDC position and ends at a crank angle position CA later than the predetermined crank angle position by a predetermined crank angle. The largest in-cylinder pressure angle θ pmax#i is calculated as a value of the crank angle position CA at which the in-cylinder pressure PS#i indicates a largest value in the largest in-cylinder pressure angle-calculating section. In the following description, the in-cylinder pressure PS#i, motoring pressure PM#i, and combustion pressure PC#i at a time point when the value of the crank angle position is equal to "θ" are denoted by "PS#i(θ)", "PM#i(θ)", and "PC#i(θ)", respectively.

FIG. 3 shows a process for calculating the largest combustion pressure angle θ pcmax, and the present process is carried out in synchronism with generation of the CRK signal. As shown in FIG. 3, in the present process, first, the motoring pressure PM#i(θ) and the in-cylinder pressure PS#i(θ) are calculated in the above-mentioned largest in-cylinder pressure angle-calculating section (step 11). The motoring pressure PM#i(θ) is in-cylinder pressure which is generated when combustion is not performed in each cylinder 3*a*, and is calculated by a gas state equation according to the intake air amount QA, the intake air temperature TA, and the capacity of each cylinder 3*a* (combustion chamber 3*e*) dependent on the crank angle position CA. On the other hand, the in-cylinder pressure PS#i(θ) is calculated by integrating the pressure change amount DPV detected by the in-cylinder pressure sensor 20, and then correcting the integral value in respect of a pyroelectricity-dependent error.

Then, the difference between the calculated in-cylinder pressure PS#i(θ) and the motoring pressure PM#i(θ) is calculated as the combustion pressure PC#i(θ) (step 12). The combustion pressure PC#i(θ) indicates pressure generated by combustion itself in each cylinder 3*a*.

Subsequently, it is determined whether or not the present value of the combustion pressure PC#i(θ) is larger than the largest combustion pressure PCmax#i (step 13). If the answer to the question of the step 13 is affirmative (YES), the present value of the combustion pressure PC#i(θ) is set to the largest combustion pressure PCmax#i (step 14). Then, a value θ of the crank angle position CA at the time is set to the largest combustion pressure angle θ pcmax#i (step 15), followed by terminating the present process. On the other hand, if the answer to the question of the step 13 is negative (NO), the steps 14 and 15 are skipped, to immediately terminate the present process. The process for calculating the largest combustion pressure angle θ pcmax#i is executed in the largest in-cylinder pressure angle-calculating section, as described above, whereby the largest combustion pressure angle θ pcmax#i is calculated.

Referring again to FIG. 2, in a step 5, the difference Δθ max#i between the largest combustion pressure angle θ pcmax#i and the largest in-cylinder pressure angle θ pmax#i is calculated. Then, it is determined whether or not the valve timing of the intake valve 4*a* and the exhaust valve 5*a* is HI.VT (step 6). If the answer to the question of the step 6 is affirmative (YES), a threshold θ cmbmd is retrieved from a HI.VT map (step 7), and the program proceeds to a step 9. On the other hand, if the answer to the question of the step 6 is negative (NO), i.e. if the valve timing is LO.VT, the threshold θ cmbmd is retrieved from a LO.VT map (step 8), and the program proceeds to the step 9. Each of the HI.VT map and the LO.VT map is formed by empirically determining an optimum value of the threshold θ cmbmd according to load on the engine 3 and the engine speed NE, and mapping the determined values, respectively.

Then, in the step 9, it is determined whether the difference Δθ max#i calculated in the step 5 is larger than the threshold θ cmbmd determined in the step 7 or 8. If the answer to the question of the step 9 is affirmative (YES), it is determined that the combustion mode is the weak combustion mode, and to indicate this fact, the step 2 is carried out, followed by terminating the present process. On the other hand, if the answer to the question of the step 9 is negative (NO), i.e. if Δθ max#i≦θ cmbmd holds, it is determined that the combustion mode is the intense combustion mode, and to indicate this fact, the weak combustion mode flag F_COMB#i is set to 0 (step 10), followed by terminating the present process.

Figure 4:
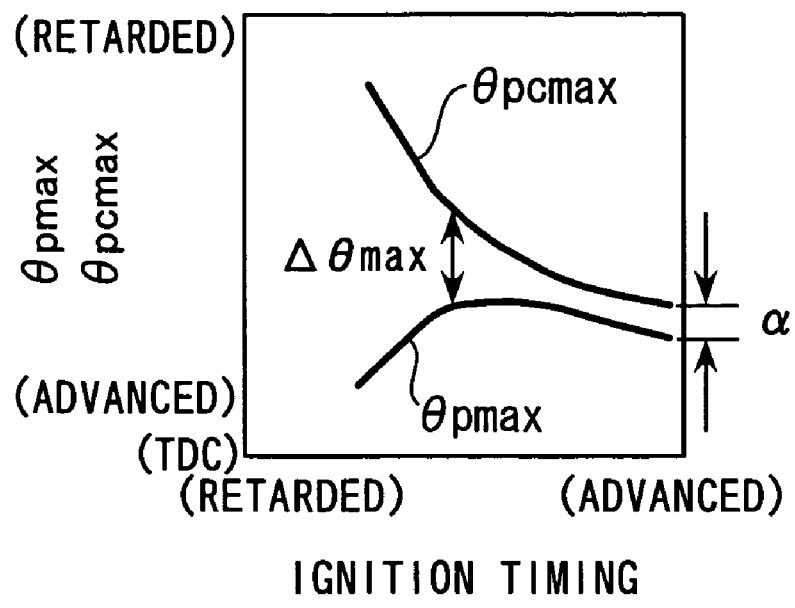
FIG. 4 is a diagram showing a relationship between a largest in-cylinder pressure angle and a largest combustion pressure angle with respect to ignition timing.
Figure 5:
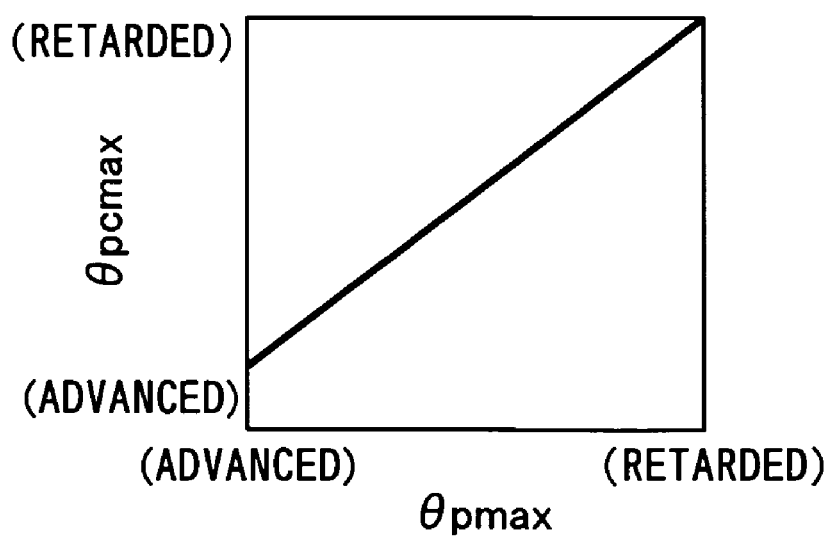
FIG. 5 is a diagram showing a relationship between the largest in-cylinder pressure angle and the largest combustion pressure angle in an intense combustion mode.

The combustion mode is determined, as described above, using the difference Δθ max#i between the largest combustion pressure angle θ pcmax#i and the largest in-cylinder pressure angle θ pmax#i for the following reason: FIG. 4 shows the relationship between the largest combustion pressure angle θ pcmax and a largest in-cylinder pressure angle θ pmax with respect to the ignition timing. As shown in FIG. 4, as the ignition timing is retarded from the advanced side to the retarded side (from the right side to the left side in FIG. 4), the largest in-cylinder pressure angle θ pmax is slowly retarded (changes toward the upper side in FIG. 4), and if the ignition timing is further retarded, inversely, the largest in-cylinder pressure angle θ pmax is advanced (changes toward the lower side in FIG. 4). As the ignition timing is retarded, the largest in-cylinder pressure angle θ pmax changes in this way, because the in-cylinder pressure PS in the vicinity of the largest value of the motoring pressure PM (in the vicinity of the TDC position) is detected as the largest value by the in-cylinder sensor 20, and the crank angle position CA at the time is calculated as the largest in-cylinder pressure angle θ pmax. On the other hand, as the ignition timing is retarded, the largest combustion pressure angle θ pcmax is slowly retarded, while maintaining a substantially fixed gap α (e.g. 5°) from the largest in-cylinder pressure angle θ pmax, and if the ignition timing is further retarded, the largest combustion pressure angle θ pcmax is largely retarded. Then, when the combustion mode is the intense combustion mode, as shown in FIG. 5, the largest combustion pressure angle θ pcmax changes linearly with respect to the largest in-cylinder pressure angle θ pmax (θ pcmax=θ pmax+α). On the other hand, when the combustion mode is the weak combustion mode, the difference Δθ max increases, and hence the linear relationship mentioned above does not hold. Therefore, in the step 9, by comparing the difference Δθ max#i with the threshold θ cmbmd, it is possible to properly determine whether the combustion mode is the intense combustion mode or the weak combustion mode on a cylinder-by-cylinder basis.

Figure 6A:
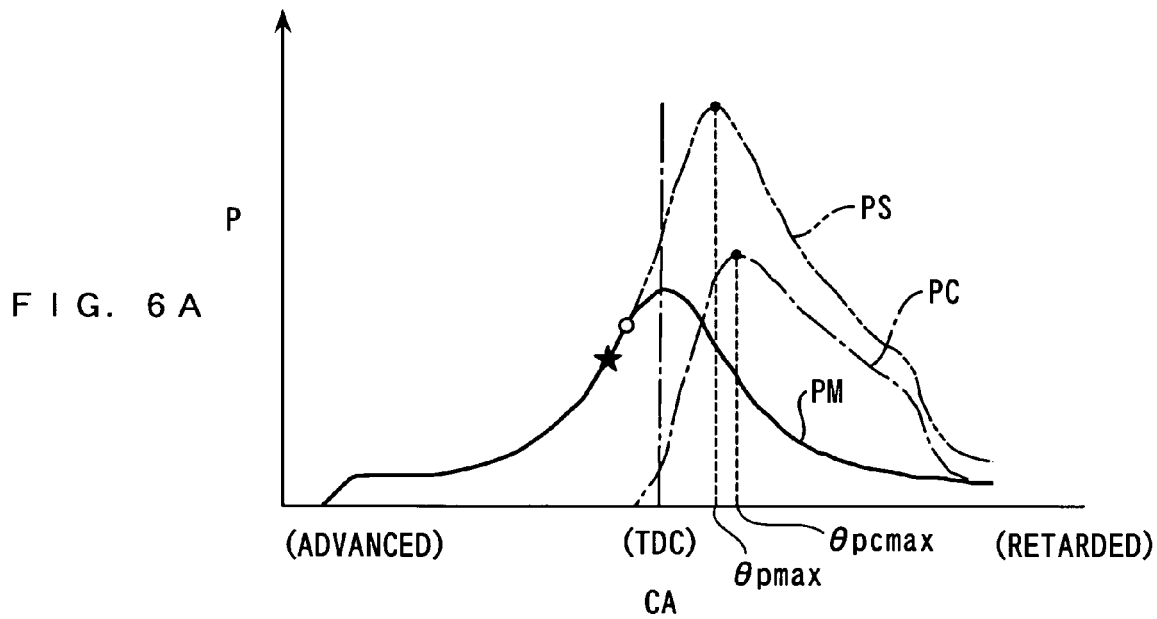
FIG. 6A is a diagram showing an example of changes in in-cylinder pressure, motoring pressure, and combustion pressure in the intense combustion mode.
Figure 6B:
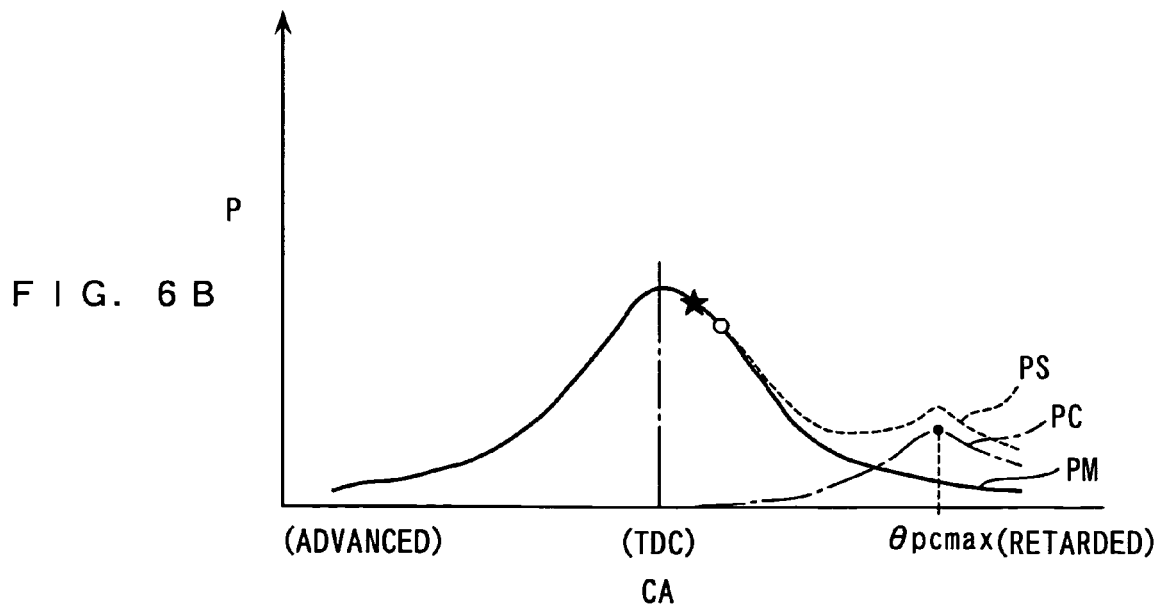
FIG. 6B is a diagram showing an example of changes in in-cylinder pressure, motoring pressure, and combustion pressure in a weak combustion mode.

FIGS. 6A and 6B show examples of changes in the in-cylinder pressure PS, the motoring pressure PM, and the combustion pressure PC, occurring over a range from the compression stroke to the expansion stroke, with the TDC position indicated in the center, and FIGS. 6A and 6B respectively show changes in the intense combustion mode and changes in the weak combustion mode. A star in both of FIGS. 6A and 6B indicates ignition timing, and a white circle indicates ignition timing. As shown in FIGS. 6A and 6B, in both cases of the intense combustion mode and the weak combustion mode, the motoring pressure PM becomes largest in the vicinity of the TDC position, and a substantially bilaterally symmetrical curve appears with the largest value as the center.

As shown in FIG. 6A, in the intense combustion mode, the in-cylinder pressure PS becomes largest at a crank angle position more retarded with respect to the TDC position, and the crank angle position CA at the time is calculated as the largest in-cylinder pressure angle θ pmax. Further, the combustion pressure PC becomes largest at a crank angle position more retarded than the largest in-cylinder pressure angle θ pmax, and the crank angle position CA at the time is calculated as the largest combustion pressure angle θ pcmax. On the other hand, as shown in FIG. 6B, in the weak combustion mode, the in-cylinder pressure PS changes similarly to the motoring pressure PM before ignition, and changes while continuing to be larger than the motoring pressure PM due to generation of pressure by combustion after ignition. Further, the combustion pressure PC becomes largest at a crank angle position more retarded with respect to the ignition timing, and the crank angle position CA at the time is calculated as the largest combustion pressure angle θ pcmax. As described above, in both of the intense combustion mode and the weak combustion mode, the largest combustion pressure angle θ pcmax is accurately calculated.

Next, a description will be given of an ignition timing calculation process with reference to FIG. 7. In this process, first, in a step 21, a provisional basic ignition timing IGMAP is calculated. More specifically, according to the engine speed NE and the accelerator pedal opening AP, a demanded torque PMCMD is calculated by searching a map, not shown, and then, the provisional basic ignition timing IGMAP is calculated by searching a map, not shown, according to the demanded torque PMCMD and the engine speed NE.

Then, a correction term IGCRT#i is calculated on a cylinder-by-cylinder basis (step 22). Specifically, the correction term IGCRT#i is calculated by searching various maps, not shown, according to the various parameters, including the intake air temperature TA, the engine coolant temperature TW, etc. Then, a basic ignition timing IGBASE#i is calculated by the following equation (1) (step 23):

IGBASE#i=IGMAP+IGCRT#i　　　(1)

Next, it is determined whether or not the weak combustion mode flag F_COMB#i is equal to 1 (step 24). If the answer to the question of the step 24 is negative (NO), i.e. if the combustion mode is the intense combustion mode, a target largest in-cylinder pressure angle θ pmax_cmd serving as a target of the largest in-cylinder pressure angle θ pmax#i is calculated (step 25). The calculation of the target largest in-cylinder pressure angle θ pmax_cmd is carried out by searching a predetermined map, not shown, according to the engine speed NE and the intake pressure PBA. The map is configured such that if the ignition timing is controlled such that the largest in-cylinder pressure angle θ pmax#i becomes equal to a corresponding value therein, the ignition timing is controlled to MBT (Minimum advance for Best Torque).

Then, a largest pressure angle correction term IGSLD#i is calculated according to the above-mentioned target largest in-cylinder pressure angle θ pmax_cmd and the largest in-cylinder pressure angle θ pmax#i calculated in the step 3 (step 26), and by adding the calculated largest pressure angle correction term IGSLD#i to the basic ignition timing IGBASE#i, the ignition timing IGLOG is calculated (step 27), followed by terminating the present process. The above-mentioned largest pressure angle correction term IGSLD#i is calculated as a value for converging the largest in-cylinder pressure angle θ pmax#i to the target largest in-cylinder pressure angle θ pmax_cmd with an algorithm including a sliding mode control algorithm.

The above-described algorithm including the sliding mode control algorithm is disclosed in Japanese Laid-Open Patent Publication (Kokai) No. 2008-57438 filed by the present assignee, and hence a detailed description of calculating method is omitted.

Figure 8:
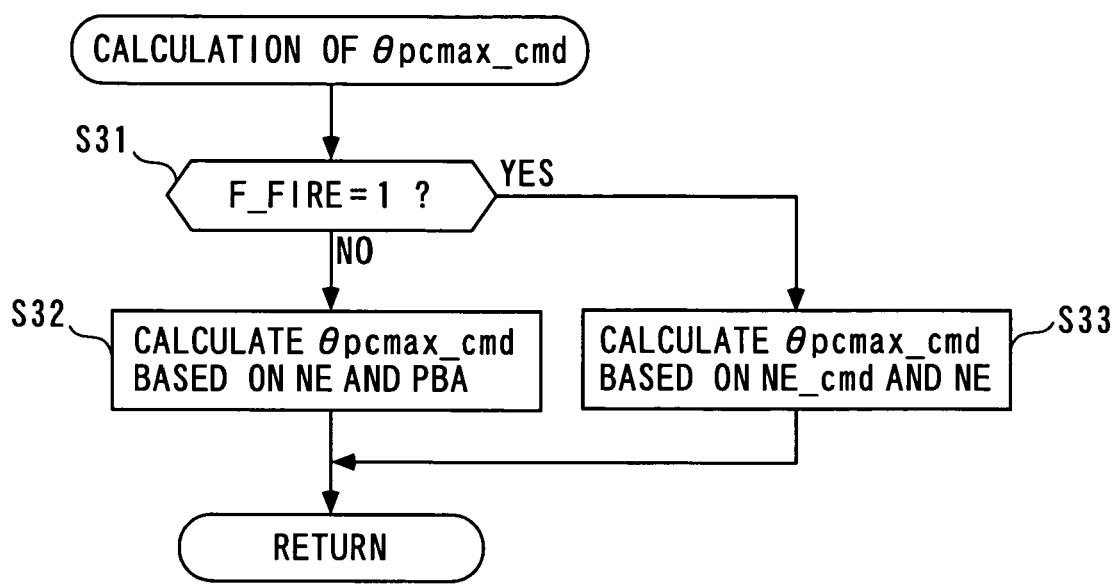
FIG. 8 is a flowchart of a target largest combustion pressure angle calculation process.
Figure 9:
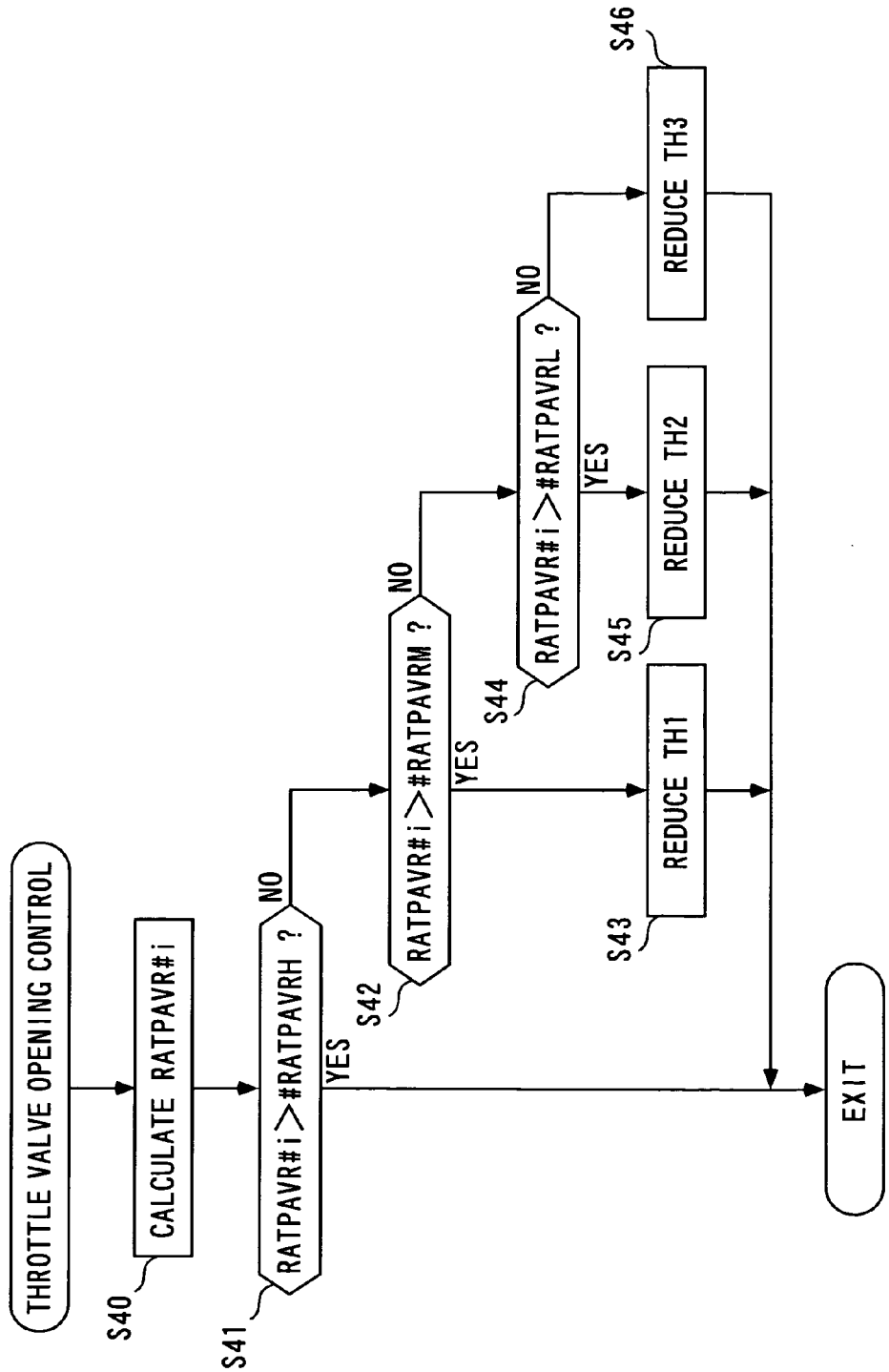
FIG. 9 is a flowchart of a throttle valve opening control process.

On the other hand, if the answer to the question of the step 24 is affirmative (YES), i.e. if F_COMB#i=1 holds, which means that the combustion mode is the weak combustion mode, a target largest combustion pressure angle θ pcmax_cmd (target angle) serving as a target of the largest combustion pressure angle θ pcmax#i is calculated (step 28). FIG. 8 shows a process for calculating the target largest combustion pressure angle θ pcmax_cmd. As shown in FIG. 8, in this process, first, it is determined whether or not the warm-up operation flag F_FIRE is equal to 1 (step 31). If the answer to the question of the step 31 is negative (NO), i.e. if the engine 3 is not in warm-up operation, the target largest combustion pressure angle θ pcmax_cmd is calculated according to the rotational speed NE and the intake pressure PBA (step 32), followed by terminating the present process. On the other hand, if the answer to the question of the step 31 is affirmative (YES), i.e. if the engine 3 is in warm-up operation, the target largest combustion pressure angle θ pcmax_cmd is calculated according to a target rotational speed NE_cmd and the engine speed NE of the engine 3 (step 33), followed by terminating the present process. The target rotational speed NE_cmd is set to a predetermined rotational speed (e.g. 1500 rpm) for carrying out the warm-up operation during idling of the engine.

Referring again to FIG. 7, in a step 29, the largest pressure angle correction term IGSLD#i is calculated according to the target largest combustion pressure angle θ pcmax_cmd calculated in the step 32 or 33, and the largest combustion pressure angle θ pcmax#i calculated in the step 4, and the step 27 is carried out, followed by terminating the process for calculating the ignition timing IGLOG#i. Similarly to the step 26, the largest pressure angle correction term IGSLD#i is calculated as a value for converging the largest combustion pressure angle θ pcmax#i to the target largest combustion pressure angle θ pcmax_cmd with the algorithm including the sliding mode control algorithm.

Next, a description will be given of a process for controlling the throttle valve opening TH, which is executed as the misfire prevention control of the engine 3 during idling, together with the ignition timing control. In this process, first, a misfire margin determination value RATPAVR#i (misfire margin parameter) is calculated (step 40). The misfire margin determination value RATPAVR#i is a parameter which is calculated on a cylinder-by-cylinder basis, and indicates a margin from a limit beyond which a misfire occurs. More specifically, the misfire margin determination value RATPAVR#i is calculated by dividing a cumulative value obtained by cumulative calculation of values of a pressure ratio between the in-cylinder pressure PS and the motoring pressure PM in a predetermined misfire determination section, by the number of times of the cumulative calculation. Further, the misfire determination section is set between crank angle positions which are advanced and retarded by respective predetermined crank angles from the largest combustion pressure angle θ pcmax#i.

Then, it is determined whether or not the calculated misfire margin determination value RATPAVR#i is larger than a first threshold #RATPAVRH (step 41). If the answer to the question of the step 41 is affirmative (YES), it is determined that the misfire margin is large, which means that there is a sufficient margin from the limit beyond which a misfire occurs, followed by immediately terminating the present process. On the other hand, if the answer to the question of the step 41 is negative (NO), it is determined whether or not the calculated misfire margin determination value RATPAVR#i is larger than a second threshold #RATPAVRM (<#RATPAVRH) (step 42). If the answer to the question of the step 42 is affirmative (YES), i.e. if #RATPAVRM<RATPAVR#i≦#RATPAVRH holds, the throttle valve opening TH is reduced by a predetermined angle TH1 (e.g. 0.2°) (step 43), followed by terminating the present process.

If the answer to the question of the step 42 is negative (NO), it is determined whether or not the misfire margin determination value RATPAVR#i is larger than a third threshold #RATPAVRL (<#RATPAVRM) (step 44). If the answer to the question of the step 44 is affirmative (YES), i.e. if #RATPAVRL<RATPAVR#i≦#RATPAVRM holds, the throttle valve opening TH is reduced by a predetermined angle TH2 (e.g. 0.5°) which is larger than the above-mentioned predetermined angle TH1 (step 45), followed by terminating the present process. On the other hand, if the answer to the question of the step 44 is negative (NO), i.e. if RATPAVR#i≦#RATPAVRL holds, the throttle valve opening TH is reduced by a predetermined angle TH3 (e.g. 1.0°) which is larger than the above-described predetermined angle TH2 (step 46), followed by terminating the present process.

As described above, in the present process, as the misfire margin determination value RATPAVR#i is smaller, i.e. the margin from the limit beyond which a misfire occurs is smaller and hence the misfire is more likely to occur, the throttle valve opening TH is more reduced. This causes the intake air amount QA to be reduced, and accordingly, the ignition timing is controlled in the advanced direction, that is, the ignition timing is controlled in the direction in which the combustion state in the cylinders 3a is stabilized, so that the mixture becomes easier to burn, thereby making it possible to prevent a misfire.

As described above, according to the present embodiment, it is determined whether the combustion mode is the intense combustion mode or the weak combustion mode, based on the largest in-cylinder pressure angle θ pmax#i and the largest combustion pressure angle θ pcmax#i. Then, if the combustion mode is the intense combustion mode, the ignition timing IGLOG#i is calculated by feedback such that the largest in-cylinder pressure angle θ pmax#i converges to the target largest in-cylinder pressure angle θ pmax_cmd. Since the peak at which the in-cylinder pressure PS becomes largest clearly appears in this intense combustion mode, it is possible to accurately calculate the largest in-cylinder pressure angle θ pmax#i, and by feedback-controlling the ignition timing IGLOG#i using the largest in-cylinder pressure angle θ pmax#i, it is possible to properly carry out the ignition timing control in the intense combustion mode.

On the other hand, if the combustion mode is the weak combustion mode, the ignition timing IGLOG#i is calculated by feedback such that the largest combustion pressure angle θ pcmax#i converges to the target largest combustion pressure angle θ pcmax_cmd. In the weak combustion mode, the ignition timing is thus feedback-controlled using the largest combustion pressure angle θ pcmax#i which excellently reflects the combustion state in the cylinders 3a, in place of the largest in-cylinder pressure angle θ pmax#i which may not be accurately calculated. This makes it possible to properly carry out the ignition timing control in the weak combustion mode.

Figure 10:
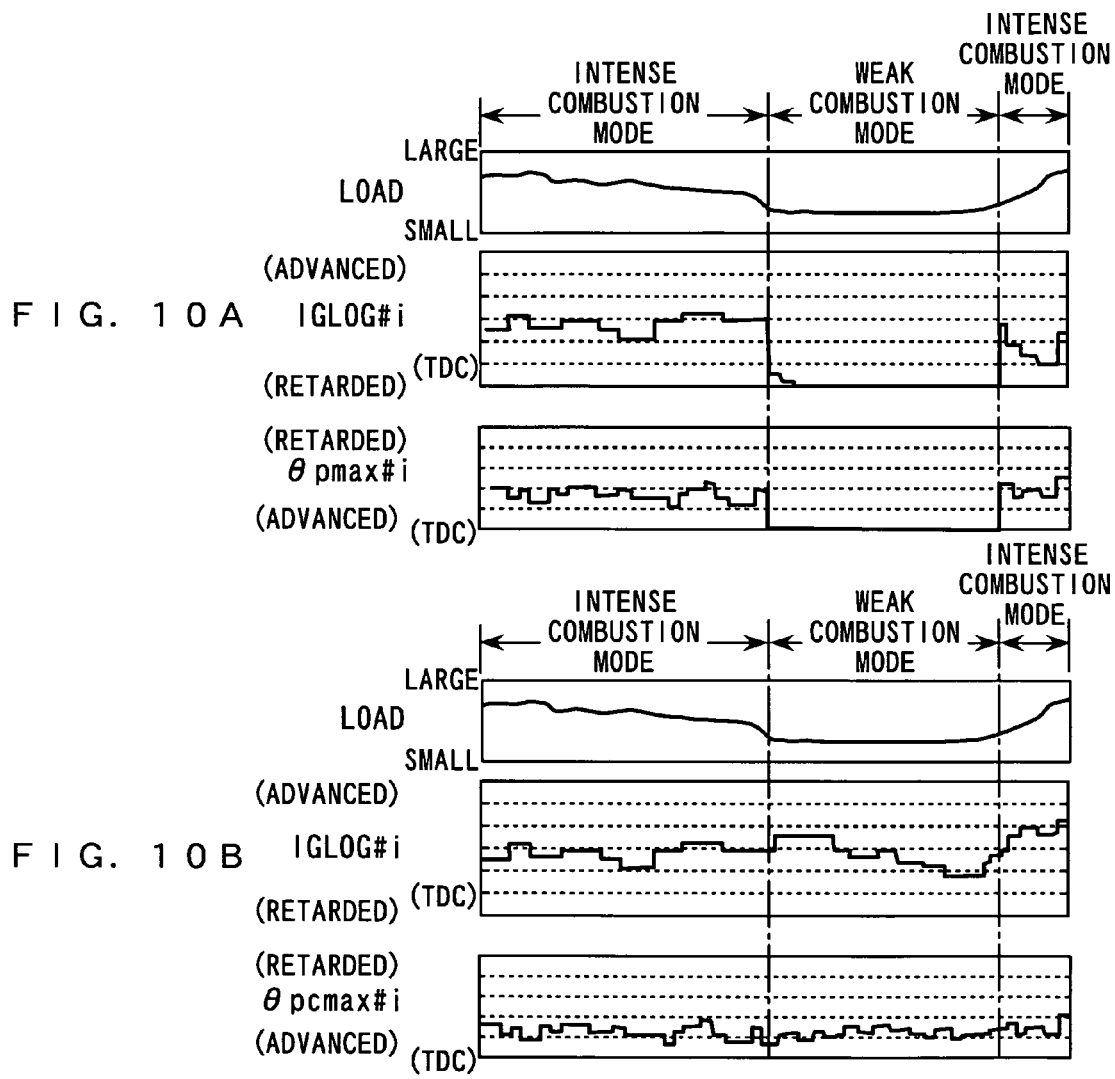
FIG. 10A is a diagram showing an example of changes in relevant parameters when the ignition timing is feedback-controlled using the largest in-cylinder pressure angle.
FIG. 10B is a diagram showing an example of changes in the relevant parameters when the ignition timing is feedback-controlled using the largest combustion pressure angle.

FIGS. 10A and 10B show examples of results of the ignition timing feedback control executed using the largest in-cylinder pressure angle θ pmax and the largest combustion pressure angle θ pcmax, respectively. It should be noted that in FIGS. 10A and 10B, respective only ones of the largest in-cylinder pressure angles θ pmax#i and the largest combustion pressure angles θ pcmax#i which are calculated on a cylinder-by-cylinder basis are shown as a representative, for clarity of illustration. As shown in FIG. 10A, if the ignition timing IGLOG#i is feedback-controlled using the largest in-cylinder pressure angle θ pmax#i, although it is possible to properly control the ignition timing IGLOG#i in the intense combustion mode, in the weak combustion mode, the TDC position is erroneously calculated as the largest in-cylinder pressure angle θ pmax#i, so that the ignition timing IGLOG#i is controlled to be excessively retarded. In contrast, if the ignition timing IGLOG#i is feedback-controlled using the largest combustion pressure angle θ pcmax#i, as shown in FIG. 10B, differently from the above-described case, the ignition timing IGLOG#i can be properly controlled without being controlled to be excessively retarded in the weak combustion mode.

As described above, by feedback-controlling the ignition timing IGLOG#i using the largest in-cylinder pressure angle θ pmax#i in the intense combustion mode, and using the largest combustion pressure angle θ pcmax#i in the weak combustion mode, it is possible to properly carry out the ignition timing control over a wide control range including both of the intense combustion mode and the weak combustion mode. This makes it possible to improve fuel economy, and suppress combustion fluctuation, thereby making it possible to improve drivability.

Further, in the present embodiment, since the determination of the combustion mode and the ignition timing control are carried out on a cylinder-by-cylinder basis, it is possible to properly determine the combustion mode on a cylinder-by-cylinder basis, and properly feedback-control the ignition timing IGLOG#i on a cylinder-by-cylinder basis. As a result, even if output characteristics vary between the cylinders 3a, it is possible to suppress variation of combustion between the cylinders 3a, while compensating for this variation of output characteristics.

Further, in the present embodiment, when the engine 3 is in warm-up operation (in the weak combustion mode), the target largest combustion pressure angle θ pcmax_cmd is calculated by feedback according to both of the engine speed NE and the target rotational speed NE_cmd such that the engine speed NE converges to the target rotational speed NE_cmd. Then, the ignition timing IGLOG#i is calculated by feedback such that the largest combustion pressure angle θ pcmax#i converges to the target largest combustion pressure angle θ pcmax_cmd.

Figure 11:
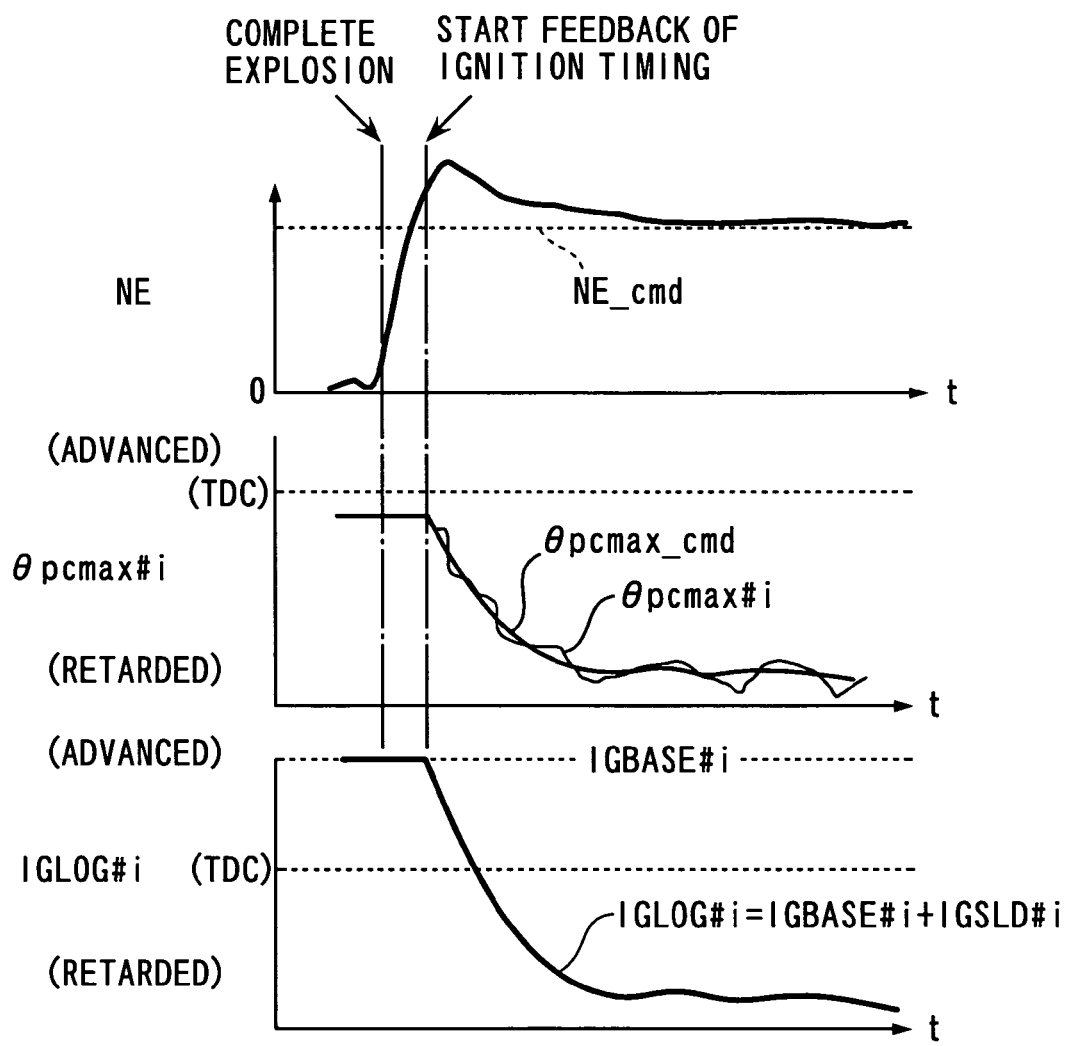
FIG. 11 is a diagram which is useful in explaining results of the control performed after starting the engine, which shows examples of changes in the engine rotational speed, the largest combustion pressure angle and the ignition timing.

FIG. 11 shows an example of changes in the engine speed NE, the largest combustion pressure angle θ pcmax, and the ignition timing IGLOG in warm-up operation of the engine 3 after it is started. In FIG. 11, respective only ones of the largest combustion pressure angles θ pcmax#i and the ignition timings IGLOG#i which are calculated on a cylinder-by-cylinder basis are shown as a representative, for clarity of illustration. As shown in FIG. 11, after complete explosion of the engine 3, when the engine speed NE becomes larger than the target rotational speed NE_cmd (e.g. 1500 rpm) by a predetermined value, feedback control of the ignition timing IGLOG#i is started. In this case, first, the target largest combustion pressure angle θ pcmax_cmd is feedback-controlled such that the engine speed NE converges to the target rotational speed NE_cmd. As a result, in this example, the target largest combustion pressure angle θ pcmax_cmd is largely changed to be more retarded than the TDC position, and is thereafter controlled to a substantially fixed value. Then, the ignition timing IGLOG#i is feedback-controlled such that the largest combustion pressure angle θ pcmax converges to the target largest combustion pressure angle θ pcmax_cmd. As a result, the ignition timing IGLOG#i is once largely retarded from the advanced side to the retarded side with respect to the TDC position, and is thereafter controlled to a substantially fixed value.

By the double feedback control comprising feedback control of the target largest combustion pressure angle θ pcmax_cmd, and feedback control of the ignition timing IGLOG#i as described above, it is possible to properly carry out the ignition timing control, while maintaining the engine speed NE at the target rotational speed NE_cmd in warm-up operation of the engine 3.

Figure 12:
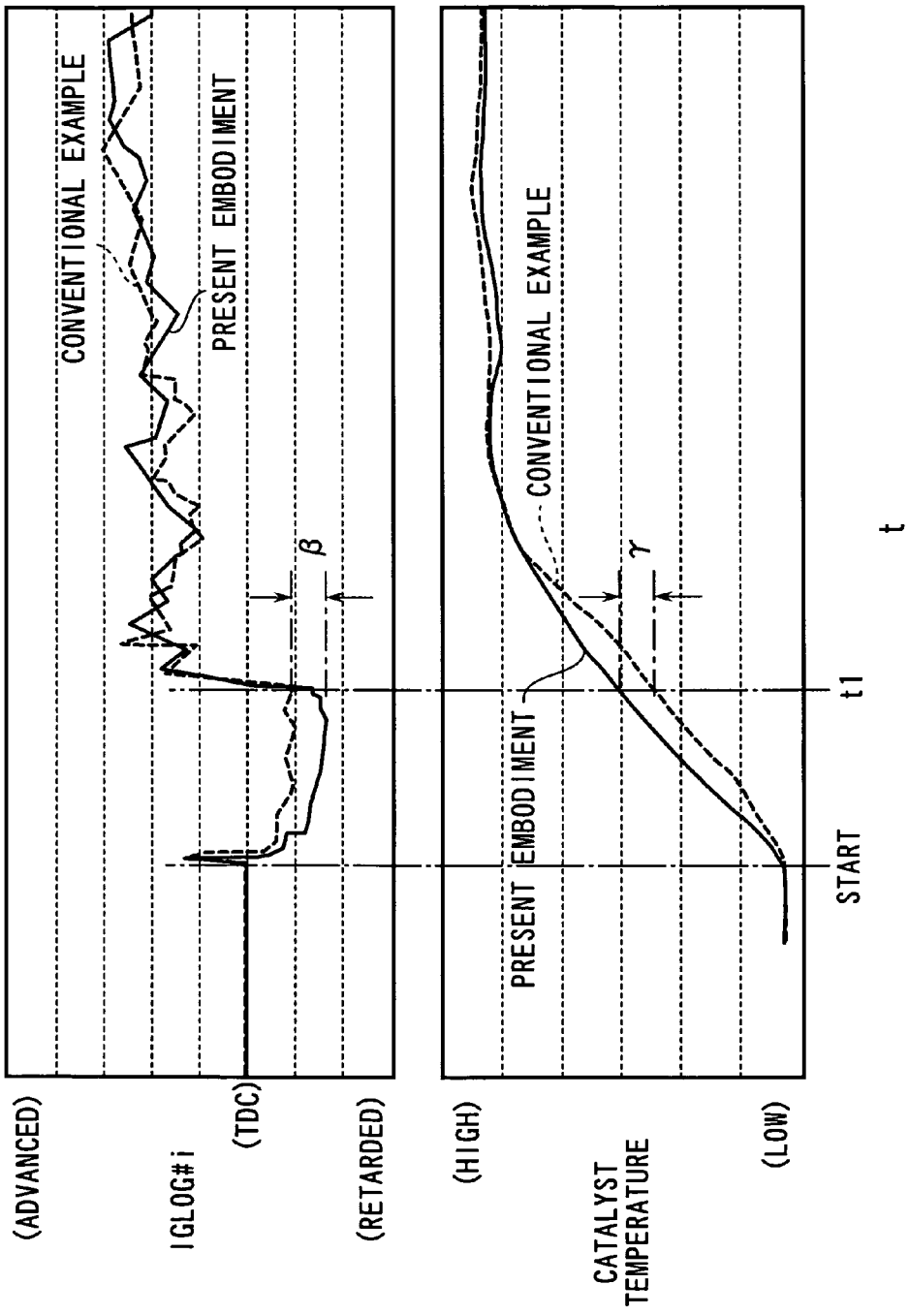
FIG. 12 is a diagram which is useful in explaining the results of the control performed after starting the engine, which shows examples of changes in the ignition timing and catalyst temperature, in contrast with examples of the conventional control.

FIG. 12 shows an example of changes in the ignition timing IGLOG#i and the temperature of the catalytic device 12 (catalyst temperature) from the start of the engine 3, in contrast to a conventional example. As shown in the upper part of FIG. 12, by carrying out the above-described ignition timing control, it is possible to retard the ignition timing IGLOG#i by β (e.g. an average of 5°), as compared with the conventional example, for a time period from the start of the engine 3 to a predetermined time point t1 (for e.g. 20 seconds) in the present embodiment. As a result, as shown in the lower part in FIG. 12, at the predetermined time point t1 after the start of the engine 3, the catalyst temperature becomes higher by γ (e.g. 50° C.) in the present embodiment as compared with the conventional example. The warm-up of the catalytic device 12 can thus be achieved earlier by the ignition timing control according to the present embodiment.

Next, a description will be given of a second embodiment in which combustion mode determination and ignition timing control are carried out using a largest heat release rate angle θ dQ/d θ max as a combustion state parameter, in place of the largest combustion pressure angle θ pcmax in the above-described embodiment (hereinafter referred to as the "first embodiment"), with reference to FIGS. 13 to 15. It should be noted that different points from the first embodiment will be mainly described in the following explanation.

Figure 13:
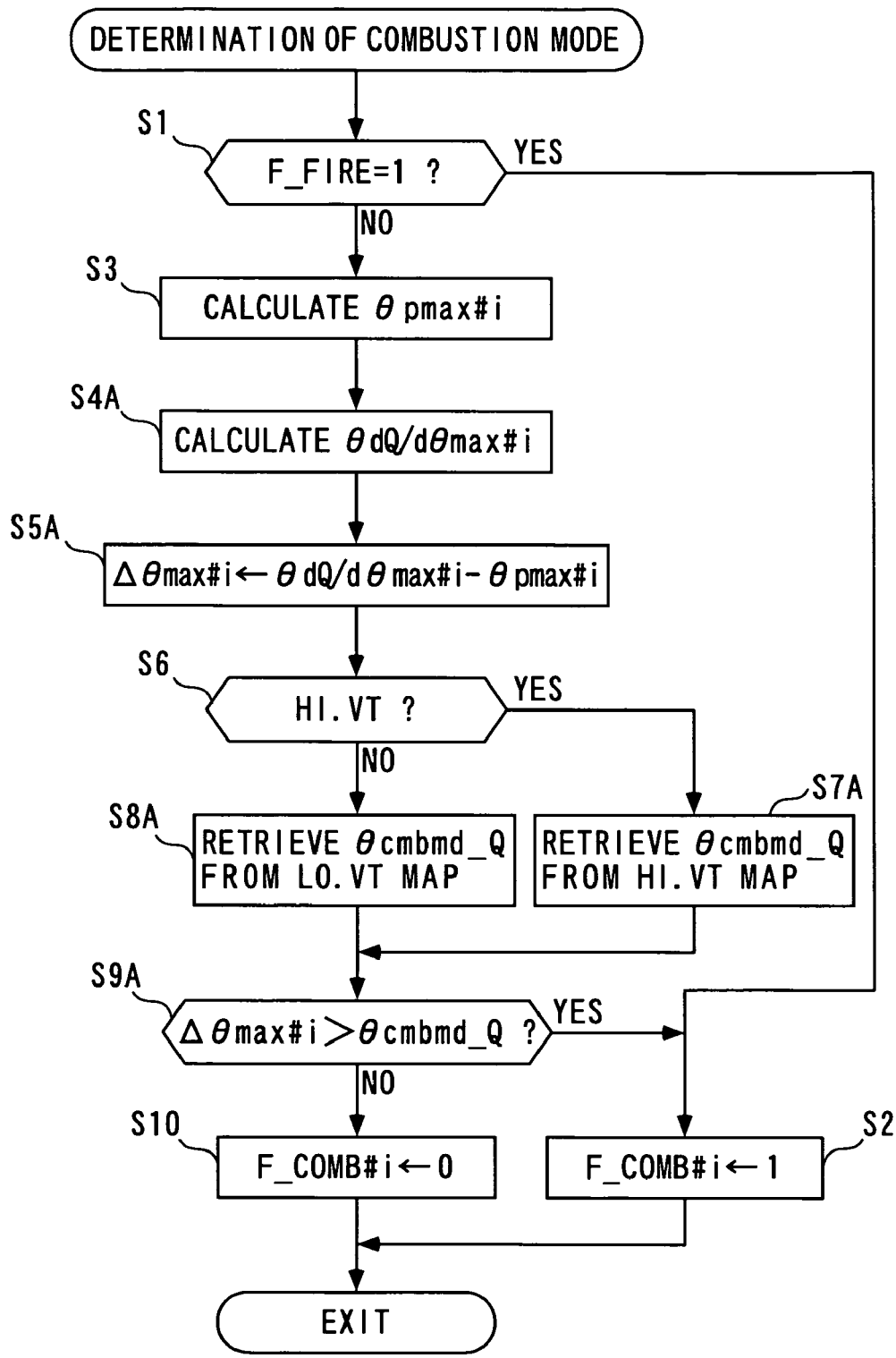
FIG. 13 is a flowchart of a combustion mode determination process executed by an ignition timing control system according to a second embodiment of the present invention.

FIG. 13 shows a combustion mode determination process according the present embodiment, and corresponds to FIG. 2 for the first embodiment. As shown in FIG. 13, in the present process, after carrying out the step 3, a largest heat release rate angle θ dQ/d θ max#i is calculated (step 4A). The largest heat release rate angle θ dQ/d θ max#i is a crank angle position CA at which the amount of heat generated by combustion in the cylinders 3a per unit crank angle, that is, a heat release rate dQ/d θ becomes largest. The heat release rate dQ/d θ is calculated by the following equation (2):

$$\frac{dQ}{d\theta}(\theta) = k \times P(\theta) \times \frac{dV}{d\theta}(\theta) + V(\theta) \times \frac{dP}{d\theta}(\theta) \quad (2)$$

$\frac{dQ}{d\theta}(\theta)$:

HEAT RELEASE RATE [J/deg]
κ: SPECIFIC HEAT RATIO
P(θ): IN-CYLINDER PRESSURE [kPa]
V(θ): COMBUSTION CHAMBER VOLUME [mm³]

$\frac{dV}{d\theta}(\theta)$:

RATE OF CHANGE IN COMBUSTION CHAMBER VOLUME [mm³/deg]

$\frac{dP}{d\theta}(\theta)$:

RATE OF RISE IN IN-CYLINDER PRESSURE [kPa/deg]

In the above equation, the specific heat ratio κ is set to a predetermined value.

Subsequently, the difference Δ θ max#i between the largest heat release rate angle θ dQ/d θ max#i and the largest in-cylinder pressure angle θ pmax#i is calculated (step 5A), and the process proceeds to the step 6. Then, if the answer to the question of the step 6 is affirmative (YES), i.e. if the valve timing is HI.VT, a threshold θ cmbmd_Q is retrieved from the HI.VT map adapted to the present embodiment (step 7A), and the process proceeds to a step 9A. On the other hand, if the answer to the question of the step 6 is negative (NO), the threshold θ cmbmd_Q is retrieved from the LO.VT map adapted to the present embodiment (step 8A), and the process proceeds to a step 9A.

Then, in the step 9A, it is determined whether or not the above-described difference Δ θ max#i is larger than the threshold θ cmbmd_Q determined in the step 7A or 8A. If the answer to the question of the step 9A is affirmative (YES), it is determined that the combustion mode is the weak combustion mode, the weak combustion mode flag F_COMB#i is set to 1 (step), followed by terminating the present process. On the other hand, if the answer to the question of the step 9A is negative (NO), it is determined that the combustion mode is the intense combustion mode, and the weak combustion mode flag F_COMB#i is set to 0 (step 10), followed by terminating the present process.

Figure 14:
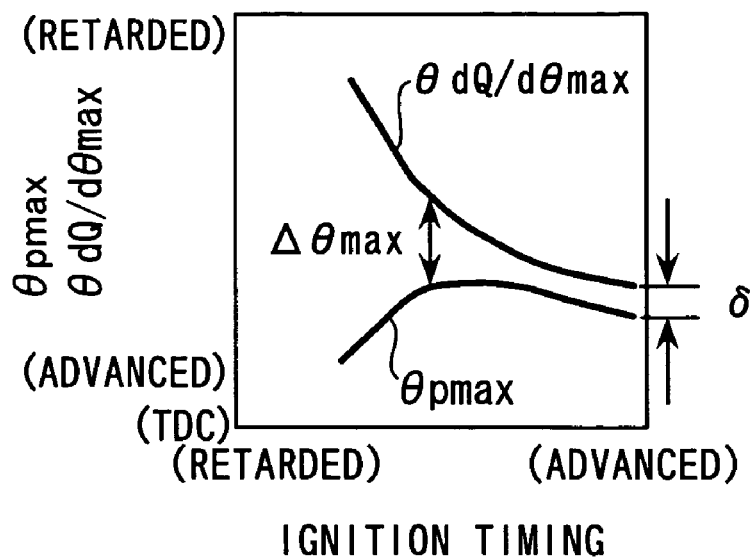
FIG. 14 is a diagram showing a relationship between a largest in-cylinder pressure angle and a largest heat release rate angle with respect to the ignition timing.

FIG. 14 shows a relationship between the largest heat release rate angle θ dQ/d θ max and the largest in-cylinder pressure angle θ pmax with respect to the ignition timing. As shown in FIG. 14, the largest heat release rate angle θ dQ/d θ max and the largest in-cylinder pressure angle θ pmax have a similar relationship to that between the largest combustion pressure angle θ pcmax and the largest in-cylinder pressure angle θ pmax mentioned in the first embodiment (see FIG. 4). That is, as the ignition timing is retarded, the largest heat release rate angle θ dQ/d θ max is slowly retarded, while maintaining a substantially fixed gap δ (e.g. 6°) from the largest in-cylinder pressure angle θ pmax, and if the ignition timing is further retarded, the largest heat release rate angle θ dQ/d θ max is largely retarded. Further, the largest heat release rate angle θ dQ/d θ max changes linearly with respect to the largest in-cylinder pressure angle θ pmax (θ dQ/d θ max=θ pmax+δ) when the combustion mode is the intense combustion mode. On the other hand, when the combustion mode is the weak combustion mode, the above-mentioned linear relationship does not hold. Therefore, in the step 9A, by comparing the difference Δ θ max#i with the threshold θ cmbmd_Q, similarly to the first embodiment, it is possible to properly determine whether the combustion mode is the intense combustion mode or the weak combustion mode for the respective cylinders 3a.

Figure 15:
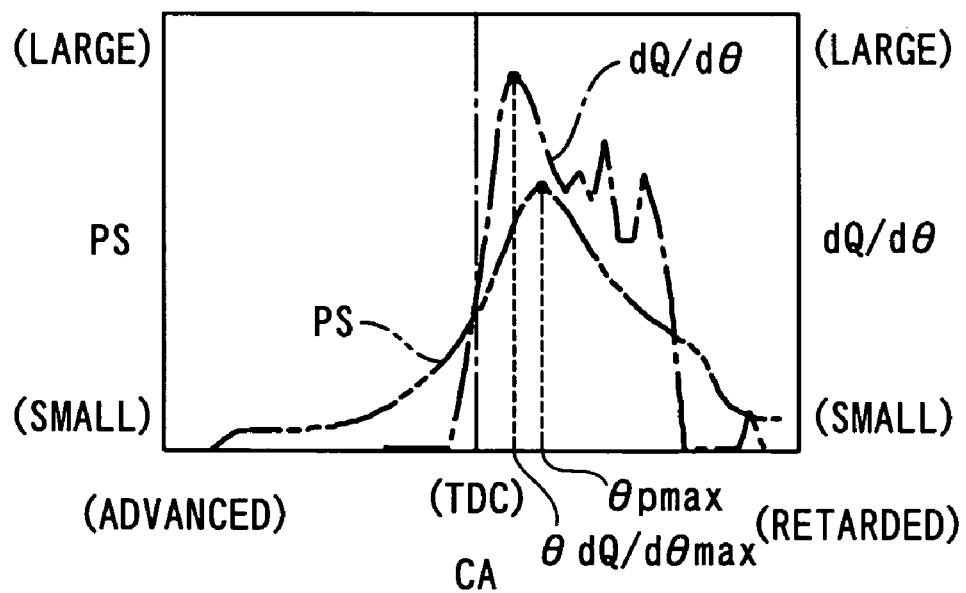
FIG. 15 is a diagram showing an example of changes in in-cylinder pressure and heat release rate, in a state of the intense combustion mode.

FIG. 15 shows an example of changes in the in-cylinder pressure PS and the heat release rate dQ/d θ, occurring over a range from the compression stroke to the expansion stroke in the intense combustion mode, with the TDC position indicated in the center. As shown in FIG. 15, the heat release rate dQ/dθ becomes largest at a crank angle position more advanced than the largest in-cylinder pressure angle θ pmax, and the crank angle position CA at the time is calculated as the largest heat release rate angle θ dQ/dθ max. Although not shown, in the weak combustion mode, a peak at which the heat release rate dQ/dθ becomes largest clearly appears similarly to the intense combustion mode, and the crank angle position CA at the time is calculated as the largest heat release rate angle θ dQ/dθ max. Therefore, in the present embodiment, similarly to the largest combustion pressure angle θ pcmax in the first embodiment, the largest heat release rate angle θ dQ/dθ max is accurately calculated in both of the high and the weak combustion modes.

Figure 7:
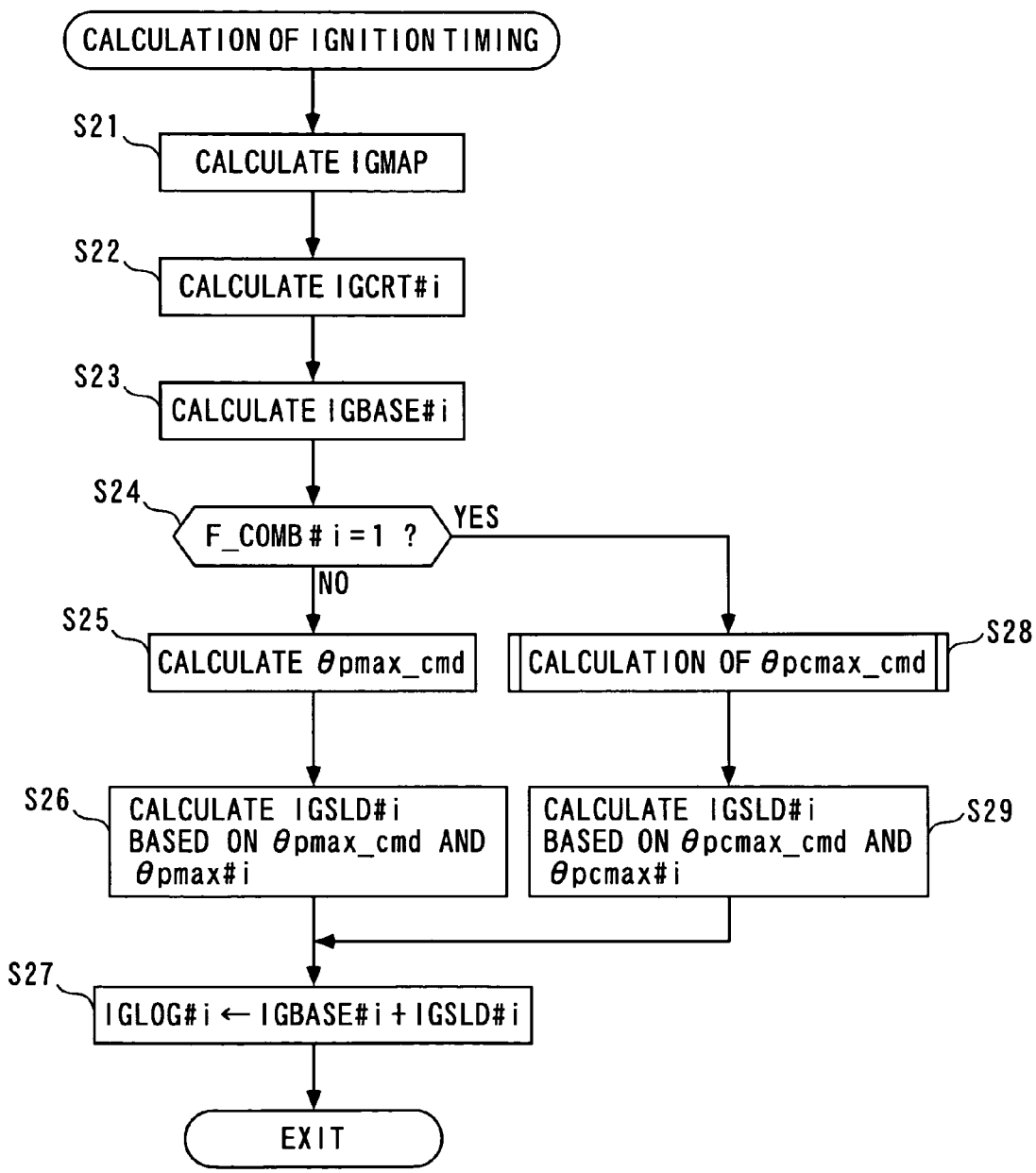
FIG. 7 is a flowchart of an ignition timing calculation process.
Figure 16:
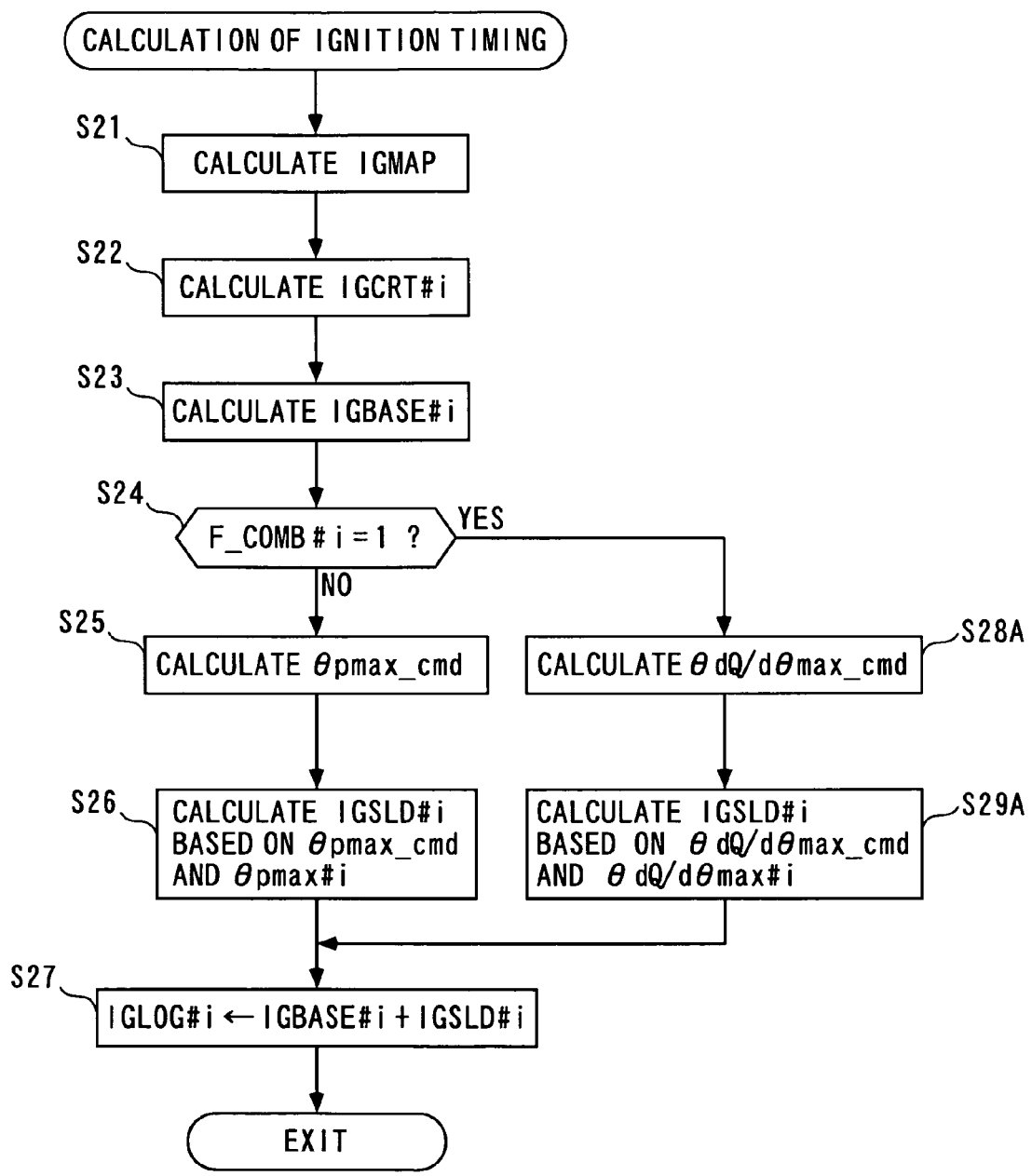
FIG. 16 is a flowchart of an ignition timing calculation process executed by the ignition timing control system according to the second embodiment.

FIG. 16 shows an ignition timing calculation process executed by the ignition timing control system according to the present embodiment, and corresponds to FIG. 7 of the first embodiment. As shown in FIG. 16, in the step 24 in the present process, it is determined whether or not the weak combustion mode flag F_COMB#i is equal to 1, and if the answer to the question of the step 24 is negative (NO), i.e. if the combustion mode is the intense combustion mode, similarly to the first embodiment, the steps 25 to 27 are carried out, followed by terminating the present process. Thus, the ignition timing IGLOG#i in the intense combustion mode is calculated.

On the other hand, if the answer to the question of the step 24 is affirmative (YES), i.e. if the combustion mode is the weak combustion mode, a target largest heat release rate angle θ dQ/dθ max_cmd (target angle) serving as a target of the largest heat release rate angle θ dQ/dθ max#i is calculated (step 28A). When the engine 3 is not in warm-up operation, similarly to the first embodiment, the target largest heat release rate angle θ dQ/dθ max_cmd is calculated according to the engine speed NE and the intake pressure PBA. On the other hand, when the engine 3 is in warm-up operation, the target largest heat release rate angle θ dQ/dθ max_cmd is calculated according to the target rotational speed NE_cmd of the engine 3 and the engine speed NE.

Next, the largest pressure angle correction term IGSLD#i is calculated according to the target largest heat release rate angle θ dQ/dθ max_cmd calculated in the step 28A and the largest heat release rate angle θ dQ/dθ max#i calculated in the step 4A (step 29A), and then the step 27 is carried out, followed by terminating the process for calculating the ignition timing IGLOG#i.

As described above, in the second embodiment, the combustion mode is determined and the ignition timing is feedback-controlled using the largest heat release rate angle θ dQ/dθ max in place of the largest combustion pressure angle θ pcmax used in the first embodiment. The largest heat release rate angle θ dQ/dθ max accurately represents one characteristic of the combustion state in the cylinders 3a, similarly to the largest combustion pressure angle θ pcmax. Therefore, by employing the largest heat release rate angle θ dQ/dθ max as a combustion state parameter, it is possible to obtain the same advantageous effects as provided by the first embodiment, as described above.

Next, a description will be given of a third embodiment in which combustion mode determination and ignition timing control are carried out using an ignition position θ csp as a combustion state parameter, in place of the largest combustion pressure angle θ pcmax in the first embodiment, with reference to FIGS. 17 and 18. Different points from the first embodiment will be mainly described in the following explanation, similarly to the above-described second embodiment.

Figure 17:
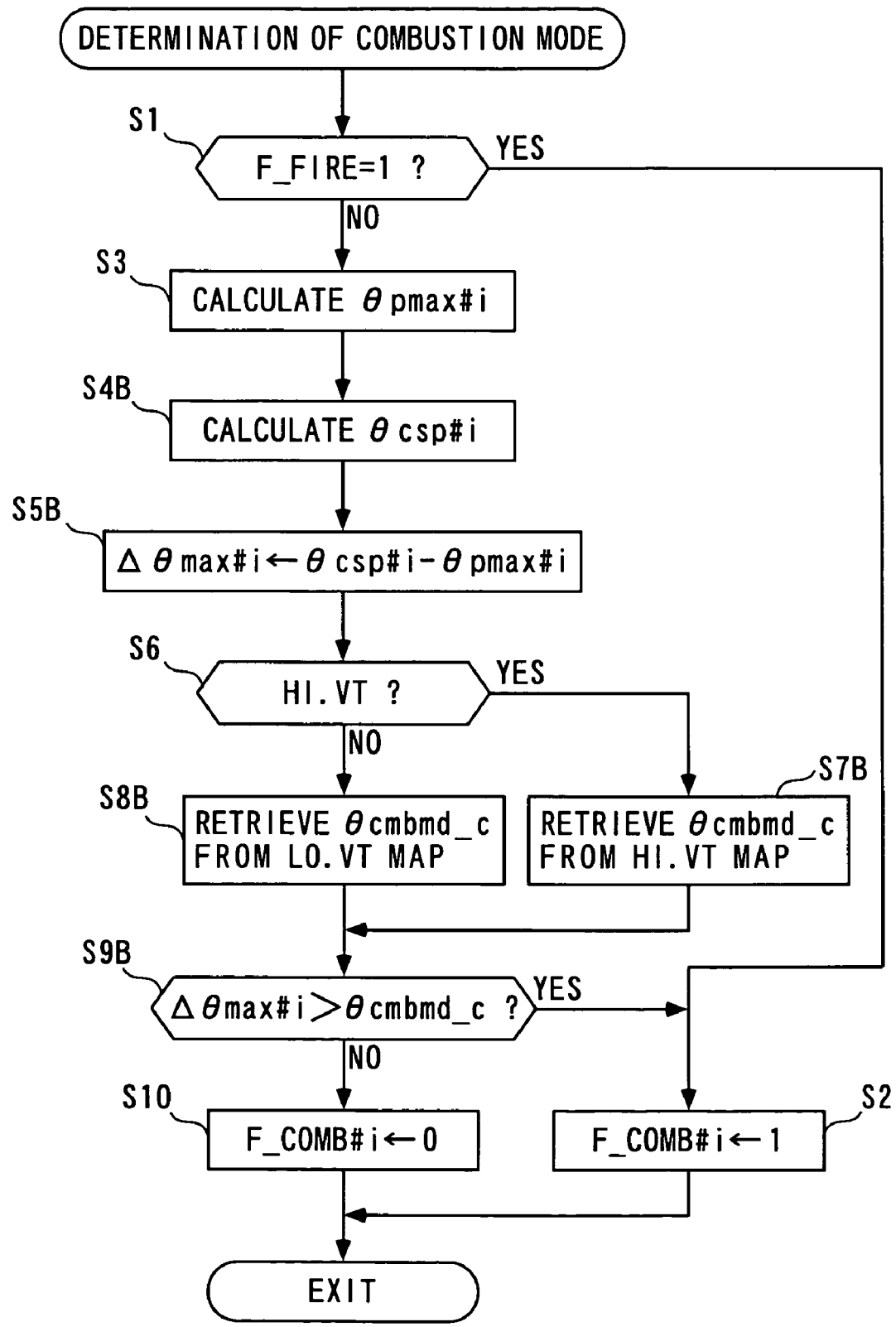
FIG. 17 is a flowchart of a combustion mode determination process executed by an ignition timing control system according to a third embodiment of the invention.

FIG. 17 shows a combustion mode determination process according to the present embodiment, and corresponds to FIG. 2 of the first embodiment. As shown in FIG. 17, in this process, after carrying out the step 3, an ignition position θ csp#i is calculated (step 4B). The ignition position θ csp#i is a crank angle position CA which corresponds to an ignition timing csp#i in each cylinder 3a. The ignition timing csp#i is a timing at which the combustion of a mixture actually starts after ignition by the ignition plug 6, and is defined as a crank angle position CA at which mass burning ratio is equal to e.g. 5%. The expression "mass burning ratio is equal to 5%" is intended to mean that a heat release amount Q obtained by integrating the above-described equation (2) reaches 5%.

Subsequently, the difference Δθ max#i between the ignition position θ csp#i and the largest in-cylinder pressure angle θ pmax#i is calculated (step 5B), and the process proceeds to the step 6. Then, if the answer to the question of the step 6 is affirmative (YES), i.e. if the valve timing is HI.VT, a threshold θ cmbmd_c is retrieved from a HI.VT map (step 7B) adapted to the present embodiment, and the program proceeds to a step 9B. On the other hand, if the answer to the question of the step 6 is negative (NO), the threshold θ cmbmd_c is retrieved from a LO.VT map (step 8B) adapted to the present embodiment, and the program proceeds to the step 9B.

Then, it is determined in the step 9B whether the above-mentioned difference Δθ max#i is larger than the threshold θ cmbmd_c determined in the step 7B or 8B. If the answer to the question of the step 9B is affirmative (YES), it is determined that the combustion mode is the weak combustion mode, so that the weak combustion mode flag F_COMB#i is set to 1 (step 2), followed by terminating the present process. On the other hand, if the answer to the question of the step 9B is negative (NO), it is determined that the combustion mode is the intense combustion mode, so that the weak combustion mode flag F_COMB#i is set to 0 (step 10), followed by terminating the present process.

The ignition position θ csp is retarded, as the ignition timing is retarded. Thus, the ignition position θ csp has a relationship with the largest in-cylinder pressure angle θ pmax which is similar to the relationships mentioned in the first and second embodiments (see FIGS. 4 and 14). Therefore, in the present embodiment, similarly to the first and second embodiments, by comparing the difference Δθ max#i with the threshold θ cmbmd_c in the step 9B, it is possible to properly determine whether the combustion mode is the intense combustion mode or the weak combustion mode for the respective cylinders 3a.

Figure 18:
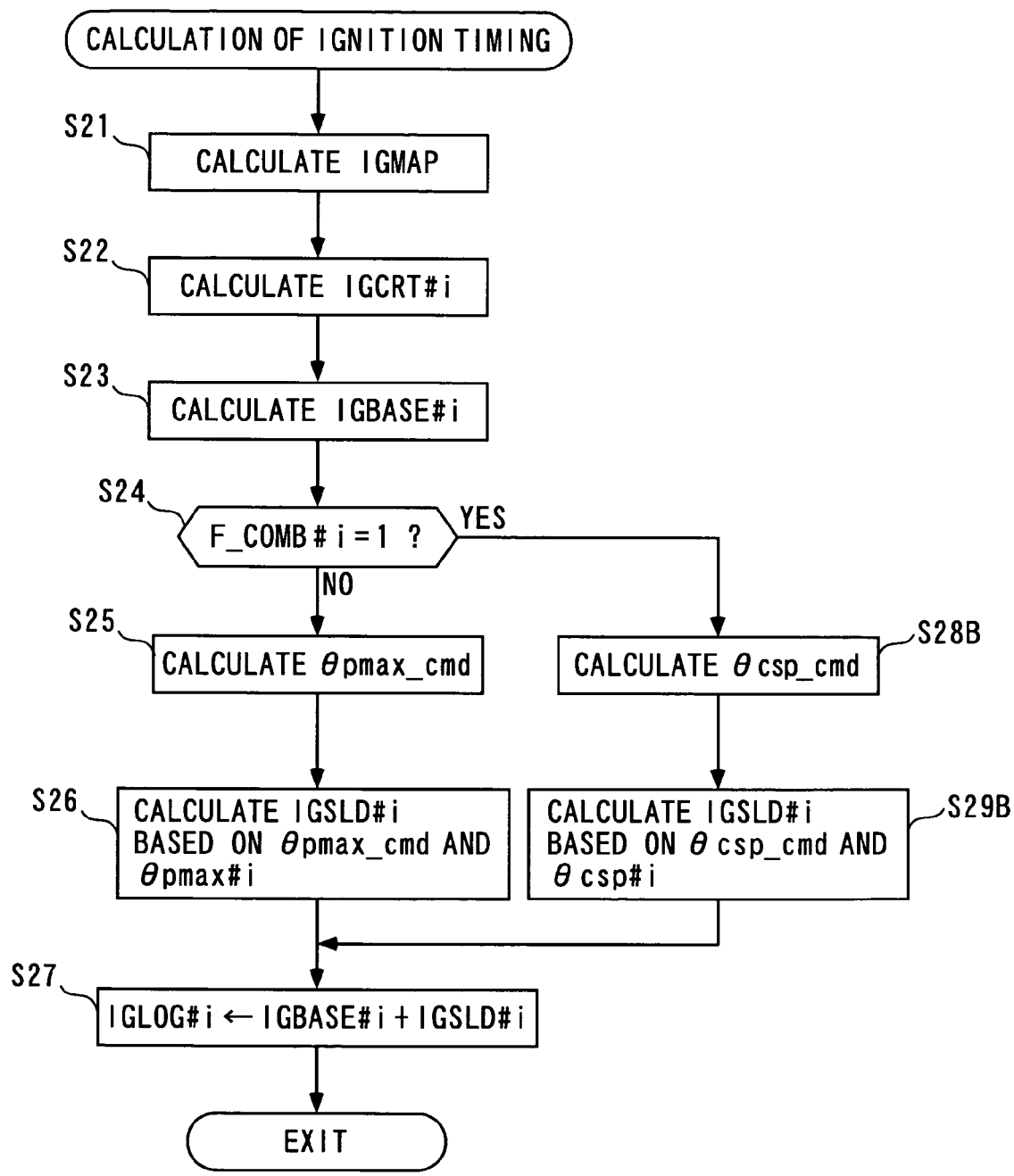
FIG. 18 is a flowchart of an ignition timing calculation process executed by the ignition timing control system according to the third embodiment.
Figure 19:
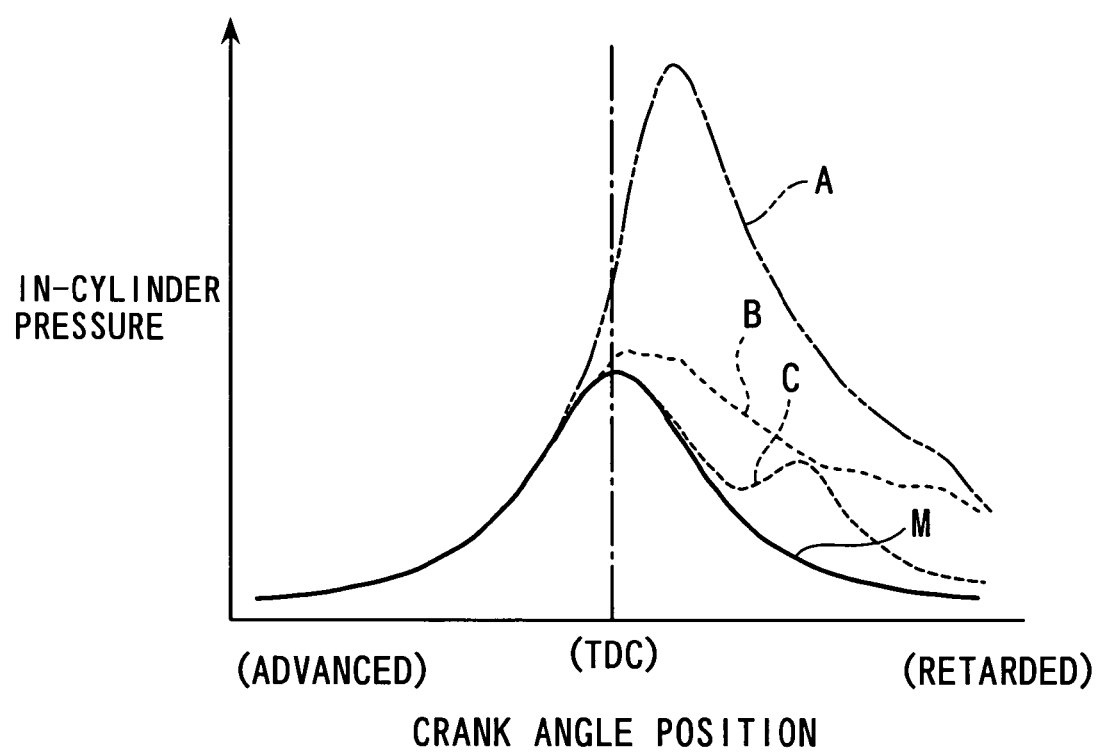
FIG. 19 is a diagram showing an example of changes in in-cylinder pressure.

FIG. 18 shows an ignition timing calculation process executed by the ignition timing control system according to the present embodiment, and corresponds to FIG. 7 of the first embodiment and FIG. 16 of the second embodiment. As shown in FIG. 18, in this process, similarly to the first and second embodiments, it is determined in the step 24 whether or not the weak combustion mode flag F_COMB#i is equal to 1, and if the answer to the question of the step 24 is negative (NO), i.e. if the combustion mode is the intense combustion mode, the ignition timing IGLOG#i in the intense combustion mode is calculated by carrying out the steps 25 to 27. On the other hand, if the answer to the question of the step 24 is affirmative (YES), i.e. if the combustion mode is the weak combustion mode, a target ignition position θ csp_cmd (target angle) serving as a target of the ignition position θ csp#i is calculated (step 28B). When the engine 3 is not in warm-up operation, similarly to the first and second embodiments, the target ignition position θ csp_cmd is calculated according to the engine speed NE and the intake pressure PBA. On the other hand, when the engine 3 is in warm-up operation, the target ignition position θ csp_cmd is calculated according to the target rotational speed NE_cmd and the engine speed NE of the engine 3.

Then, the largest pressure angle correction term IGSLD#i is calculated according to the target ignition position θ csp_cmd calculated in the step 28B and the ignition position θ csp#i calculated in the step 4B (step 29B), and then the step 27 is carried out, followed by terminating the process for calculating the ignition timing IGLOG#i.

As described above, in the third embodiment, the combustion mode is determined and the ignition timing is feedback-controlled, using the ignition position θ csp in place of the largest combustion pressure angle θ pcmax in the first embodiment. The ignition position θ csp accurately represents one characteristic of the combustion state in the cylinders 3a, similarly to the largest combustion pressure angle θ pcmax, and the largest heat release rate angle θ dQ/d θ max in the second embodiment. Therefore, by employing the ignition position θ csp as a combustion state parameter, it is possible to obtain the same advantageous effects as provided by the first embodiment, as above described.

It should be noted that the present invention is by no means limited to the embodiments described above, but it can be practiced in various forms. For example, although in the above-described first to third embodiments, in determining the combustion mode, the difference Δ θ max#i between the largest in-cylinder pressure angle θ pmax, and the largest combustion pressure angle θ pcmax, or the largest heat release rate angle θ dQ/d θ max, or the ignition position θ csp, is used, the determination of the combustion mode may be carried out using a ratio therebetween in place of the difference therebetween. Further, the combustion mode may be determined based on a correlation of two or more desired combustion state parameters selected from the group of the respective combustion state parameters of the largest in-cylinder pressure angle θ pmax, the largest combustion pressure angle θ pcmax, the largest heat release rate angle θ dQ/d θ max, and the ignition position θ csp. In addition, as one of the combustion state parameters used for determining the combustion mode, a predetermined heat release position, e.g. a crank angle position at which the mass burning ratio is equal to 5% may be employed.

Further, although in the embodiments, in carrying out the misfire prevention control, the throttle valve opening TH is reduced according to the misfire margin determination value RATPAVR, parameters other than the throttle valve opening TH may be controlled insofar as the combustion state in the cylinders 3a can be controlled in a stabilizing direction. For example, the misfire may be prevented by causing the target engine speed or the fuel injection amount of the engine 3 to be increased.

Further, in a case where the ignition timing under the feedback control reaches a predetermined limit value, in order to prevent a misfire, various parameters for adjusting combustion speed, such as the EGR amount, the fuel injection amount, the air-fuel ratio of the mixture, supercharging pressure and/or the intake air amount may be adjusted such that the ignition timing falls within a predetermined range. Further, in place of the ignition timing, various parameters which are capable of changing the combustion state, such as the EGR ratio, the valve timing and/or the intake air amount may be adjusted. In the case of a diesel engine, in place of the ignition timing, various parameters which are capable of changing the combustion state, such as the fuel injection timing, the injection ratio, the number of times of injection and/or the supercharging pressure may be adjusted.

Furthermore, although in the above-described embodiment, the present invention is applied to the gasoline engine installed on a vehicle, this is not limitative, but the present invention can be applied to various types of engines, such as a diesel engine, engines other than engines for vehicles, including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

We claim:

1. An ignition timing control system for an internal combustion engine, comprising:
   in-cylinder pressure-detecting means for detecting pressure in a cylinder of the engine as in-cylinder pressure;
   crank angle position-detecting means for detecting a crank angle position of the engine;
   largest in-cylinder pressure angle-calculating means for calculating a crank angle position at which the in-cylinder pressure becomes largest as a largest in-cylinder pressure angle, based on the detected in-cylinder pressure and crank angle position;
   target angle-setting means for setting a target angle serving as a target of the largest in-cylinder pressure angle;
   combustion state parameter-calculating means for calculating combustion state parameters indicative of a combustion state in the cylinder, other than the largest in-cylinder pressure angle, based on the in-cylinder pressure and the crank angle position;
   combustion mode-determining means for determining whether a combustion mode is an intense combustion mode or a weak combustion mode, based on a plurality of kinds of the calculated combustion state parameters including the largest in-cylinder pressure angle; and
   ignition timing-calculating means for calculating ignition timing, when the determined combustion mode is the intense combustion mode, such that the calculated largest in-cylinder pressure angle converges to the set target angle, and when the determined combustion mode is the weak combustion mode, by feedback, based on the target angle and the calculated combustion state parameters.

2. An ignition timing control system as claimed in claim 1, wherein said combustion state parameter-calculating means comprises:
   motoring pressure-estimating means for estimating pressure to be generated when combustion is not performed in the cylinder, as motoring pressure; and
   largest combustion pressure angle-calculating means for calculating a crank angle position at which a difference between the in-cylinder pressure and the estimated motoring pressure becomes largest, as a largest combustion pressure angle, and
   wherein the combustion state parameter is the calculated largest combustion pressure angle.

3. An ignition timing control system as claimed in claim 2, wherein said combustion mode-determining means determines the combustion mode using the largest combustion pressure angle and the largest in-cylinder pressure angle as the combustion state parameters.

4. An ignition timing control system as claimed in claim 1, wherein said combustion state parameter-calculating means comprises:

largest heat release rate angle-calculating means for calculating a crank angle at which a heat release rate in the cylinder becomes largest, as a largest heat release rate angle, based on the in-cylinder pressure, and wherein the combustion state parameter is the calculated largest heat release rate angle.

5. An ignition timing control system as claimed in claim 1, wherein said combustion state parameter-calculating means comprises:

ignition position-calculating means for calculating a crank angle position corresponding to an ignition timing in the cylinder as an ignition position, based on the in-cylinder pressure, and wherein the combustion state parameter is the calculated ignition position.

6. An ignition timing control system as claimed in claim 1, wherein the cylinder comprises a plurality of cylinders, wherein said combustion mode-determining means determines the combustion mode for the cylinders, on a cylinder-by-cylinder basis, and wherein said ignition timing-calculating means calculates the ignition timing for the cylinders, on a cylinder-by-cylinder basis.

7. An ignition timing control system as claimed in claim 1, further comprising:

operating condition-detecting means for detecting operating conditions of the engine;

warm-up operation-determining means for determining based on the detected operating conditions whether or not the engine is in warm-up operation for activating a catalyst;

rotational speed-detecting means for detecting a rotational speed of the engine; and target rotational speed-setting means for setting a target rotational speed serving as a target of the rotational speed, and wherein said target angle-setting means sets the target angle by feedback such that the detected rotational speed converges to the set target rotational speed, when it is determined that the engine is in the warm-up operation.

8. An ignition timing control system as claimed in claim 7, wherein said combustion mode-determining means determines that the combustion mode is the weak combustion mode, when it is determined that the engine is in the warm-up operation.

9. An ignition timing control system as claimed in claim 7, further comprising:

misfire margin parameter-calculating means for calculating a misfire margin parameter indicative of a margin from a limit beyond which a misfire occurs, for the cylinders, on a cylinder-by-cylinder basis, based on the in-cylinder pressure and the estimated motoring pressure; and combustion state-stabilizing means for controlling the combustion state in the cylinders in a stabilizing direction, when the calculated misfire margin parameter is not more than a predetermined threshold.

10. A method of controlling ignition timing of an internal combustion engine, comprising:

an in-cylinder pressure-detecting step of detecting pressure in a cylinder of the engine as in-cylinder pressure;

a crank angle position-detecting step of detecting a crank angle position of the engine;

a largest in-cylinder pressure angle-calculating step of calculating a crank angle position at which the in-cylinder pressure becomes largest as a largest in-cylinder pressure angle, based on the detected in-cylinder pressure and crank angle position;

a target angle-setting step of setting a target angle serving as a target of the largest in-cylinder pressure angle;

a combustion state parameter-calculating step of calculating combustion state parameters indicative of a combustion state in the cylinder, other than the largest in-cylinder pressure angle, based on the in-cylinder pressure and the crank angle position;

a combustion mode-determining step of determining whether a combustion mode is an intense combustion mode or a weak combustion mode, based on a plurality of kinds of the calculated combustion state parameters including the largest in-cylinder pressure angle; and an ignition timing-calculating step of calculating ignition timing, when the determined combustion mode is the intense combustion mode, such that the calculated largest in-cylinder pressure angle converges to the set target angle, and when the determined combustion mode is the weak combustion mode, by feedback, based on the target angle and the calculated combustion state parameters.

11. A method as claimed in claim 10, wherein said combustion state parameter-calculating step comprises:

a motoring pressure-estimating step of estimating pressure to be generated when combustion is not performed in the cylinder, as motoring pressure; and a largest combustion pressure angle-calculating step of calculating a crank angle position at which a difference between the in-cylinder pressure and the estimated motoring pressure becomes largest, as a largest combustion pressure angle, and wherein the combustion state parameter is the calculated largest combustion pressure angle.

12. A method as claimed in claim 11, wherein said combustion mode-determining step includes determining the combustion mode using the largest combustion pressure angle and the largest in-cylinder pressure angle as the combustion state parameters.

13. A method as claimed in claim 10, wherein said combustion state parameter-calculating step comprises:

a largest heat release rate angle-calculating step of calculating a crank angle at which a heat release rate in the cylinder becomes largest, as a largest heat release rate angle, based on the in-cylinder pressure, and wherein the combustion state parameter is the calculated largest heat release rate angle.

14. A method as claimed in claim 10, wherein said combustion state parameter-calculating step comprises:

an ignition position-calculating step of calculating a crank angle position corresponding to an ignition timing in the cylinder as an ignition position, based on the in-cylinder pressure, and wherein the combustion state parameter is the calculated ignition position.

15. A method as claimed in claim 10, wherein the cylinder comprises a plurality of cylinders, wherein said combustion mode-determining step includes determining the combustion mode for the cylinders, on a cylinder-by-cylinder basis, and wherein said ignition timing-calculating step includes calculating the ignition timing for the cylinders, on a cylinder-by-cylinder basis.

16. A method as claimed in claim 10, further comprising:

an operating condition-detecting step of detecting operating conditions of the engine;

a warm-up operation-determining step of determining based on the detected operating conditions whether or not the engine is in warm-up operation for activating a catalyst;

a rotational speed-detecting step of detecting a rotational speed of the engine; and a target rotational speed-setting step of setting a target rotational speed serving as a target of the rotational speed, and wherein said target angle-setting step includes setting the target angle by feedback such that the detected rotational speed converges to the set target rotational speed, when it is determined that the engine is in the warm-up operation.

17. A method as claimed in claim 16, wherein said combustion mode-determining step includes determining that the combustion mode is the weak combustion mode, when it is determined that the engine is in the warm-up operation.

18. A method as claimed in claim 16, further comprising:

a misfire margin parameter-calculating step of calculating a misfire margin parameter indicative of a margin from a limit beyond which a misfire occurs, for the cylinders, on a cylinder-by-cylinder basis, based on the in-cylinder pressure and the estimated motoring pressure; and a combustion state-stabilizing step of controlling the combustion state in the cylinders in a stabilizing direction, when the calculated misfire margin parameter is not more than a predetermined threshold.

19. An engine control unit including a control program for causing a computer to execute a method of controlling ignition timing of an internal combustion engine, wherein the method comprises:

an in-cylinder pressure-detecting step of detecting pressure in a cylinder of the engine as in-cylinder pressure;

a crank angle position-detecting step of detecting a crank angle position of the engine;

a largest in-cylinder pressure angle-calculating step of calculating a crank angle position at which the in-cylinder pressure becomes largest as a largest in-cylinder pressure angle, based on the detected in-cylinder pressure and crank angle position;

a target angle-setting step of setting a target angle serving as a target of the largest in-cylinder pressure angle;

a combustion state parameter-calculating step of calculating combustion state parameters indicative of a combustion state in the cylinder, other than the largest in-cylinder pressure angle, based on the in-cylinder pressure and the crank angle position;

a combustion mode-determining step of determining whether a combustion mode is an intense combustion mode or a weak combustion mode, based on a plurality of kinds of the calculated combustion state parameters including the largest in-cylinder pressure angle; and an ignition timing-calculating step of calculating ignition timing, when the determined combustion mode is the intense combustion mode, such that the calculated largest in-cylinder pressure angle converges to the set target angle, and when the determined combustion mode is the weak combustion mode, by feedback, based on the target angle and the calculated combustion state parameters.

20. An engine control unit as claimed in claim 19, wherein said combustion state parameter-calculating step comprises:

a motoring pressure-estimating step of estimating pressure to be generated when combustion is not performed in the cylinder, as motoring pressure; and a largest combustion pressure angle-calculating step of calculating a crank angle position at which a difference between the in-cylinder pressure and the estimated motoring pressure becomes largest, as a largest combustion pressure angle, and wherein the combustion state parameter is the calculated largest combustion pressure angle.

21. An engine control unit as claimed in claim 20, wherein said combustion mode-determining step includes determining the combustion mode using the largest combustion pressure angle and the largest in-cylinder pressure angle as the combustion state parameters.

22. An engine control unit as claimed in claim 19, wherein said combustion state parameter-calculating step comprises:

a largest heat release rate angle-calculating step of calculating a crank angle at which a heat release rate in the cylinder becomes largest, as a largest heat release rate angle, based on the in-cylinder pressure, and wherein the combustion state parameter is the calculated largest heat release rate angle.

23. An engine control unit as claimed in claim 19, wherein said combustion state parameter-calculating step comprises:

an ignition position-calculating step of calculating a crank angle position corresponding to an ignition timing in the cylinder as an ignition position, based on the in-cylinder pressure, and wherein the combustion state parameter is the calculated ignition position.

24. An engine control unit as claimed in claim 19, wherein the cylinder comprises a plurality of cylinders, wherein said combustion mode-determining step includes determining the combustion mode for the cylinders, on a cylinder-by-cylinder basis, and wherein said ignition timing-calculating step includes calculating the ignition timing for the cylinders, on a cylinder-by-cylinder basis.

25. An engine control unit as claimed in claim 19, wherein the method further comprises:

an operating condition-detecting step of detecting operating conditions of the engine;

a warm-up operation-determining step of determining based on the detected operating conditions whether or not the engine is in warm-up operation for activating a catalyst;

a rotational speed-detecting step of detecting a rotational speed of the engine; and a target rotational speed-setting step of setting a target rotational speed serving as a target of the rotational speed, and wherein said target angle-setting step includes setting the target angle by feedback such that the detected rotational speed converges to the set target rotational speed, when it is determined that the engine is in the warm-up operation.

26. An engine control unit as claimed in claim 25, wherein said combustion mode-determining step includes determining that the combustion mode is the weak combustion mode, when it is determined that the engine is in the warm-up operation.

27. An engine control unit as claimed in claim 25, wherein the method further comprises:

a misfire margin parameter-calculating step of calculating a misfire margin parameter indicative of a margin from a limit beyond which a misfire occurs, for the cylinders, on a cylinder-by-cylinder basis, based on the in-cylinder pressure and the estimated motoring pressure; and a combustion state-stabilizing step of controlling the combustion state in the cylinders in a stabilizing direction, when the calculated misfire margin parameter is not more than a predetermined threshold.

* * * * *